United States Patent
Minagawa

(10) Patent No.: US 9,201,621 B2
(45) Date of Patent: Dec. 1, 2015

(54) INFORMATION PROCESSING APPARATUS, PRINT SYSTEM, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Tomonori Minagawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 54 days.

(21) Appl. No.: 13/985,822

(22) PCT Filed: May 9, 2013

(86) PCT No.: PCT/JP2013/002995
§ 371 (c)(1),
(2) Date: Aug. 15, 2013

(87) PCT Pub. No.: WO2013/168431
PCT Pub. Date: Nov. 14, 2013

(65) Prior Publication Data
US 2015/0124282 A1 May 7, 2015

(30) Foreign Application Priority Data
May 11, 2012 (JP) ................................ 2012-109872

(51) Int. Cl.
*G06F 3/12* (2006.01)

(52) U.S. Cl.
CPC ............ *G06F 3/1287* (2013.01); *G06F 3/1222* (2013.01); *G06F 3/1238* (2013.01); *G06F 3/1267* (2013.01); *G06F 3/1288* (2013.01); *G06F 3/122* (2013.01); *G06F 3/1272* (2013.01); *H04N 2201/0094* (2013.01)

(58) Field of Classification Search
None
See application file for complete search history.

(56) References Cited

U.S. PATENT DOCUMENTS

| 7,829,600 | B1* | 11/2010 | Trksak et al. ................ 516/73 |
| 7,861,172 | B1  | 12/2010 | Minagawa |
| 8,115,954 | B2* | 2/2012  | Tomita ...................... 358/1.15 |
| 8,189,225 | B1* | 5/2012  | Lo et al. .................... 358/1.15 |
| 8,310,703 | B2  | 11/2012 | Nuggehalli |
| 8,379,258 | B2  | 2/2013  | Uchida |
| 8,699,051 | B2* | 4/2014  | Yanagawa .................. 358/1.14 |

(Continued)

FOREIGN PATENT DOCUMENTS

| JP | 2009-54006  | 3/2009 |
| JP | 2010-267032 | 11/2010 |

(Continued)

OTHER PUBLICATIONS

U.S. Appl. No. 14/127,297, filed Dec. 18, 2013.

*Primary Examiner* — Ted Barnes
(74) *Attorney, Agent, or Firm* — Fitzpatrick, Cella, Harper & Scinto

(57) ABSTRACT

An information processing apparatus manages a first printer object that has a correspondence relationship with the image forming apparatus, and a second printer object that does not have a correspondence relationship with the image forming apparatus, holds the job without transmitting the job to a specific image forming apparatus when the second printer object is selected and a print instruction is issued, and transmits, to the image forming apparatus, the job held by the second printer object in response to an access from the image forming apparatus to the first printer object.

13 Claims, 41 Drawing Sheets

(56) References Cited

U.S. PATENT DOCUMENTS

| | | | |
|---|---|---|---|
| 9,019,535 B1* | 4/2015 | Hansen | 358/1.15 |
| 2002/0051174 A1* | 5/2002 | Betts et al. | 358/1.15 |
| 2003/0117638 A1* | 6/2003 | Ferlitsch | 358/1.13 |
| 2004/0090649 A1* | 5/2004 | Minagawa | 358/1.15 |
| 2005/0007633 A1* | 1/2005 | Kadowaki | 358/1.18 |
| 2005/0102442 A1* | 5/2005 | Ferlitsch | 710/15 |
| 2006/0274355 A1* | 12/2006 | Ferlitsch et al. | 358/1.15 |
| 2007/0146778 A1* | 6/2007 | Kitagata et al. | 358/1.15 |
| 2008/0016449 A1* | 1/2008 | Ookuma | 715/744 |
| 2010/0302579 A1* | 12/2010 | Nuggehalli et al. | 358/1.15 |
| 2011/0032559 A1* | 2/2011 | Yanagawa | 358/1.13 |
| 2011/0145351 A1* | 6/2011 | Lee et al. | 709/206 |
| 2011/0188063 A1* | 8/2011 | Nuggehalli et al. | 358/1.13 |
| 2012/0019865 A1* | 1/2012 | Takahashi et al. | 358/1.15 |
| 2012/0062946 A1* | 3/2012 | Kitagata | 358/1.15 |
| 2012/0092689 A1* | 4/2012 | Ito | 358/1.13 |
| 2012/0188602 A1* | 7/2012 | Shirai | 358/1.15 |
| 2012/0218599 A1* | 8/2012 | Kashioka | 358/1.15 |
| 2012/0229845 A1* | 9/2012 | Maekawa et al. | 358/1.15 |
| 2012/0231122 A1* | 9/2012 | Tran | 426/103 |
| 2012/0264372 A1* | 10/2012 | Chen et al. | 455/41.1 |
| 2012/0307289 A1* | 12/2012 | Ritland | 358/1.15 |
| 2012/0307293 A1* | 12/2012 | Natori | 358/1.15 |
| 2013/0033714 A1* | 2/2013 | Nakagawa | 358/1.9 |
| 2013/0033727 A1* | 2/2013 | Suzuki | 358/1.15 |
| 2013/0148145 A1* | 6/2013 | Salgado | 358/1.13 |
| 2013/0222827 A1* | 8/2013 | Watanabe | 358/1.13 |
| 2013/0226695 A1* | 8/2013 | Tamari | 705/14.49 |
| 2013/0229680 A1* | 9/2013 | Kitada et al. | 358/1.15 |
| 2013/0235418 A1* | 9/2013 | Tanaka | 358/1.15 |

FOREIGN PATENT DOCUMENTS

| | | |
|---|---|---|
| JP | 2012-63944 | 3/2012 |
| JP | 2012-88838 | 5/2012 |

* cited by examiner

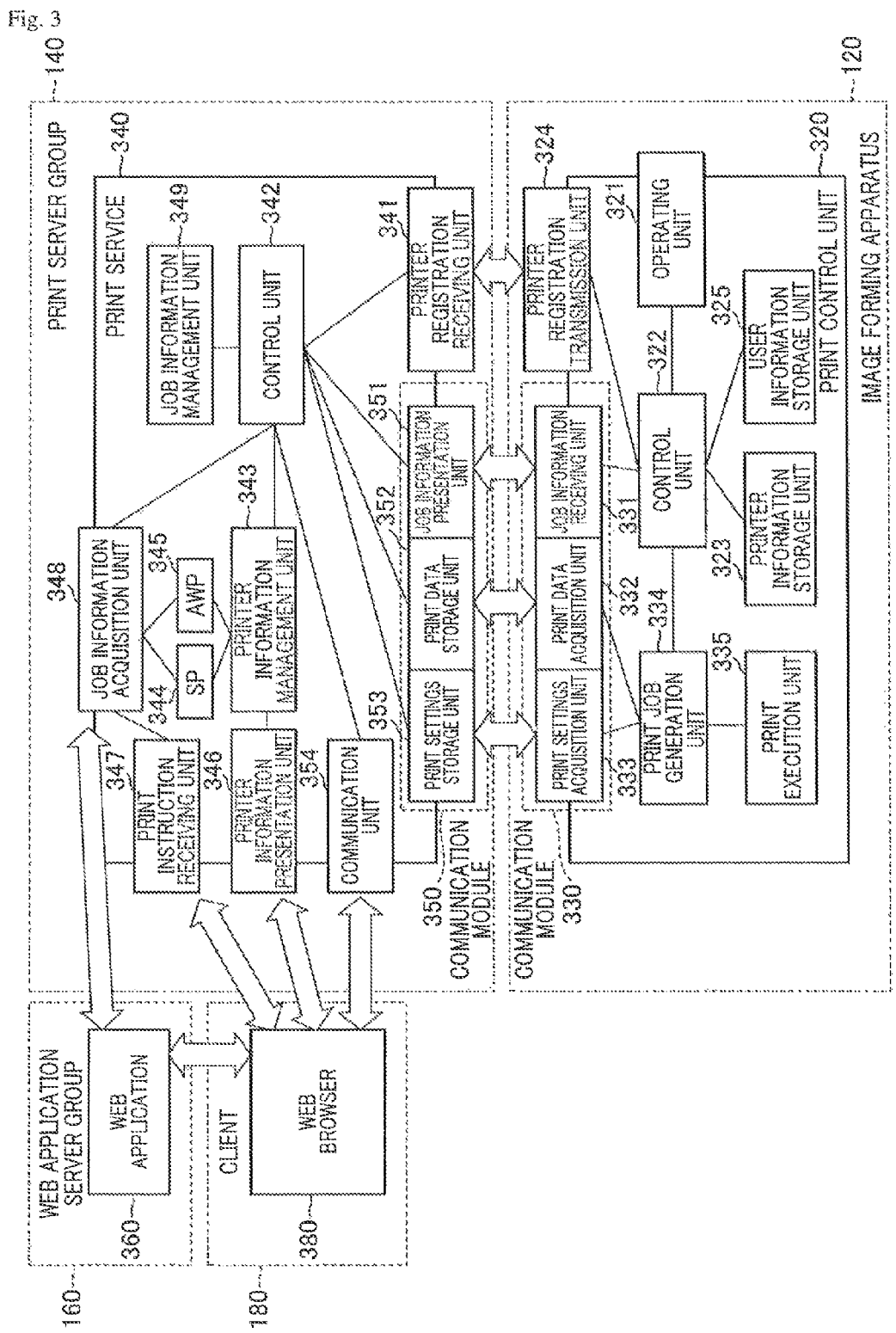

Fig. 4A

Registration of Printer in Print Service

Login of Print Relay Server — 411

User ID  [         ]
Password [         ]
                  412

Register This Printer in Print Relay Server

[ Registration Execution ]
                  413

Fig. 4B1

Print Settings

Search: [         ]

🖨 MFP-01   421
   Double-Sided Printing [1-Side ▽]
   Color Setting         [mono   ▽]
   Page Size             [A4     ▽]

🖨 MFP-02                          [+]

[ Print ]

Fig. 4B2
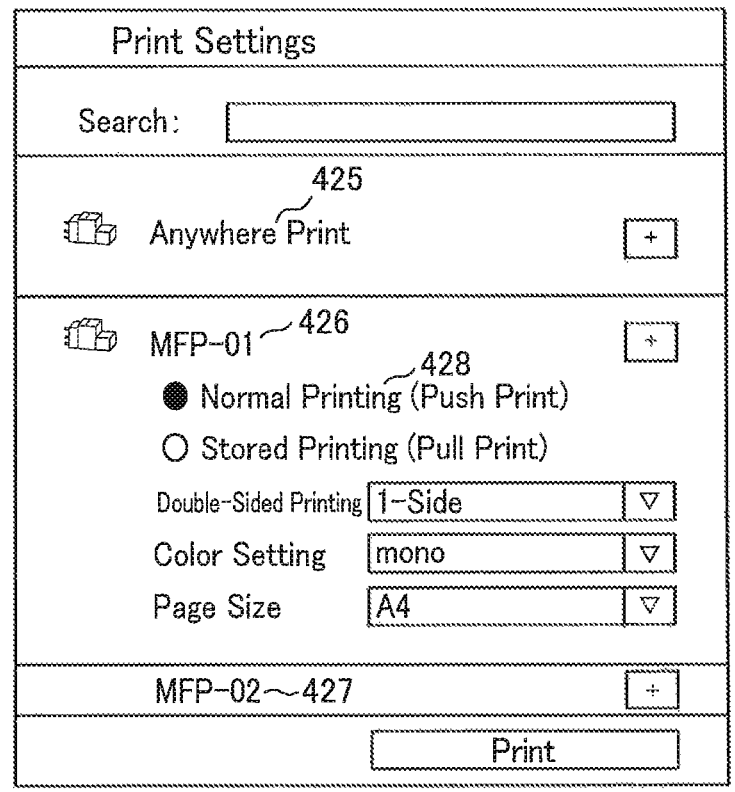
Fig. 4B3
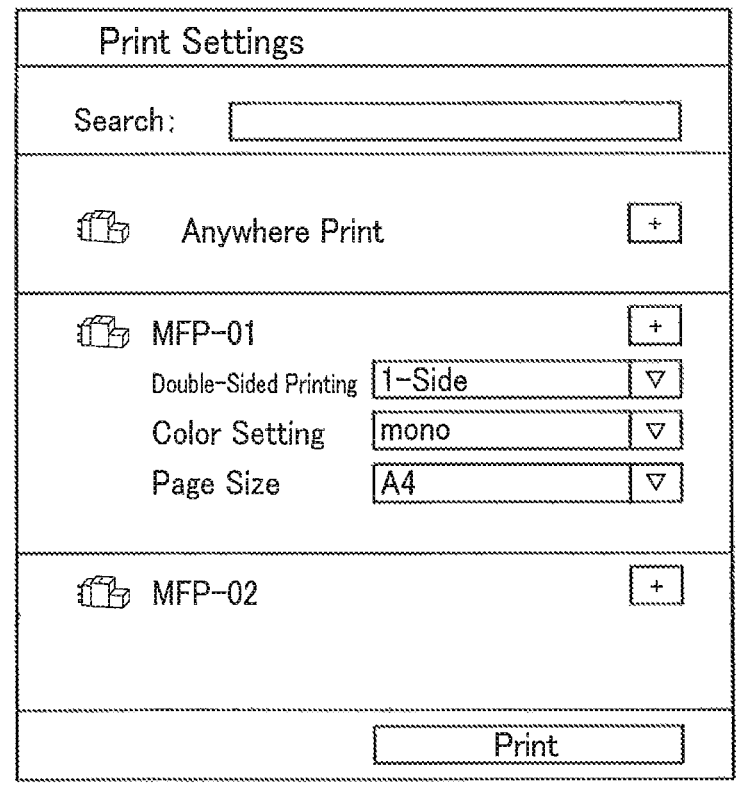

Fig. 5C1
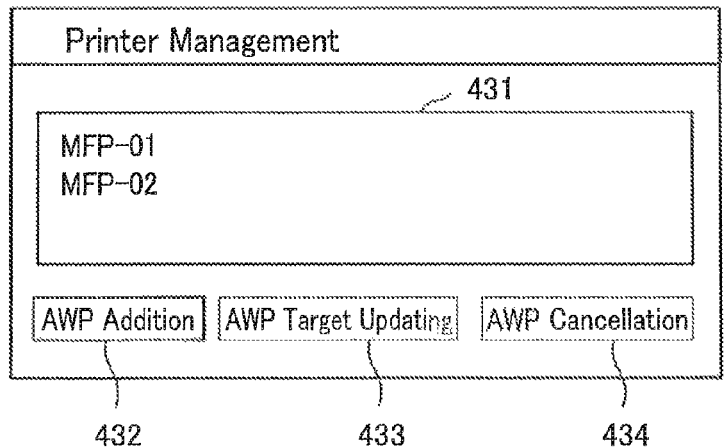
Fig. 5C2
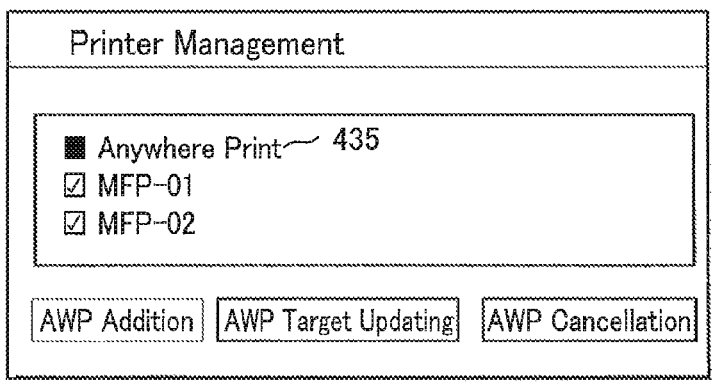
Fig. 6A
```
<Capabilities>
    <Duplex>
        <Item>1-Side</Item>
        <Item>2-Side</Item>
    </Duplex>
    <Color>
        <Item>mono</Item>
        <Item>color</Item>
    </Color>
    <PaperSize>
        <Item>B5</Item>
        <Item>A4</Item>
        <Item>A3</Item>
    </PaperSize>
</Capabilities>
```

Fig. 6B

```
<PrintSettings>
    <Duplex>
        <Item>1-Side</Item>
    </Duplex>
    <Color>
        <Item>color</Item>
    </Color>
    <PaperSize>
        <Item>A4</Item>
    </PaperSize>
</PrintSettings>
```

Fig. 6C

```
<PrintSettings>
    <Duplex>
        <Item>2-Side</Item>
    </Duplex>
    <Color>
        <Item>mono</Item>
    </Color>
    <PaperSize>
        <Item>A4</Item>
    </PaperSize>
</PrintSettings>
```

Fig. 6D

```
<Register>
    <name>
        <Item>MFP-01</Item>                    541
    </name>
    <RPID>
        <Item>RP-0001</Item>                   542
    </RPID>
    <Capabilities>                             543
        <Duplex>
            <Item>1-Side</Item>
            <Item>2-Side</Item>
        </Duplex>
        <Color>
            <Item>mono</Item>
            <Item>color</Item>
        </Color>
        <PaperSize>
            <Item>B5</Item>
            <Item>A4</Item>
            <Item>A3</Item>
        </PaperSize>
    </Capabilities>
    <PrintSettings>                            544
        <Duplex>
            <Item>1-Side</Item>
        </Duplex>
        <Color>
            <Item>color</Item>
        </Color>
        <PaperSize>
            <Item>A4</Item>
        </PaperSize>
    </PrintSettings>
</register>
```

Fig. 6E

```
<Printers>                   551
    <id>
        <Item>SP-1</Item>
    </id>
    <name>
        <Item>MFP-01</Item>
    </name>
</printers>
```

Fig. 7F

```
<PrintJob>
    <id>                            ⸺561
        <Item>JOB_001</Item>
    </id>
    <title>                         ⸺562
        <Item>Doc-001</Item>
    </title>
    <status>
        <Item>QUEUED</Item>
    </status>
    <dataUrl>                       ⸺563
        <Item>Http://prt.srv.com/
        data/8023610500269699</Item>
    </dataUrl>
    <settingUrl>                    ⸺564
        <Item>http://prt.srv.com/
        setting/8023610500269699</Item>
    </settingUrl>
</PrintJob>
```

Fig. 7G1

```
<fetch>
    <id>
        <Item> SP-1 </Item>
    </id>
</fetch>
```

Fig. 7G2

```
<fetch>
    <id>
        <Item> SP-1 </Item>
    </id>
    <mode>
        <Item> Pull </Item>
    </mode>
</fetch>
```

Fig. 7G3

```
<fetch>
    <id>
        <Item> SP-2 </Item>
    </id>
    <mode>
        <Item> Push </Item>
    </mode>
</fetch>
```

Fig. 7G4

```
<fetch>
    <id>
        <Item> AWP </Item>
    </id>
</fetch>
```

Fig. 7G5

```
<fetch>
    <id>
        <Item> SP-1 </Item>
    </id>
    <user_info>
        <Item> UserX </Item>
    </user_info>
</fetch>
```

Fig. 7G6

```
<fetch>
    <id>
        <Item> SP-1 </Item>
    </id>
    <user_id>
        <Item> u001 </Item>
    </user_id>
</fetch>
```

Fig. 7H1

```
<notification>
    <id>
        <Item> SP-1 </Item>
    </id>
</notification>
```

Fig. 7H2

```
<notification>
    <id>
        <Item> SP-1 </Item>
    </id>
    <mode>
        <Item> pull </Item>
    </mode>
</notification>
```

Fig. 7H3

```
<notification>
    <id>
        <Item> SP-1 </Item>
    </id>
    <mode>
        <Item> push </Item>
    </mode>
</notification>
```

Fig. 8A

| 611 | 612 | 613 | 614 | 615 | 616 |
|---|---|---|---|---|---|
| RPID | Printer Name | Capabilities | Initial Print Setting Values | SPID | Pull-Use SP ID |
| RP-0001 | MFP-01 | PC_1 | PT_1 | SP-1 | SP-AW |

Fig. 8B

| 621 | 622 | 623 | 624 | 625 | 626 | 627 | 628 | 629 |
|---|---|---|---|---|---|---|---|---|
| SPID | Printer Name | Printer Owner | RPID | Capabilities | Initial Print Setting Values | AWP Target Model | Sharing Destination | Sharing Source |
| SP-1 | MFP-01 | UserX | RP-0001 | PC_1 | PT_1 | - | - | - |
| SP-2 | MFP-02 | UserX | RP-0002 | PC_2 | PT_2 | - | - | - |
| SP-3 | MFP-03 | UserY | RP-0003 | PC_3 | PT_3 | - | - | - |
| ... | ... | ... | ... | ... | ... | ... | ... | ... |

Fig. 8C

| 631 | 632 | 633 | 634 | 635 | 636 | 637 | 638 | 639 | 640 |
|---|---|---|---|---|---|---|---|---|---|
| Job ID | Job Name | SPID | Print Settings | Data Storage Location | Print Settings Storage Location | Job Owner | Job Status | Mode | User ID |
| JOB_001 | Doc-001 | SP-1 | PT_J1 | http://... | http://... | UserX | Queued | -- | -- |

Fig. 8D
| 641 | 642 | 643 | 644 |
|---|---|---|---|
| Job ID | Job Name | Data Storage Location | Print Settings Storage Location |
| JOB_001 | Doc-001 | http://··· | http://··· |
Fig. 8E
| 651 | 652 | 653 | 654 |
|---|---|---|---|
| User Name | Password | Print Service User Name | Print Service Password |
| User-X | *** | UserX | *** |
| User-Y | *** | UserY | *** |
| ··· | ··· | ··· | ··· |
Fig. 9A
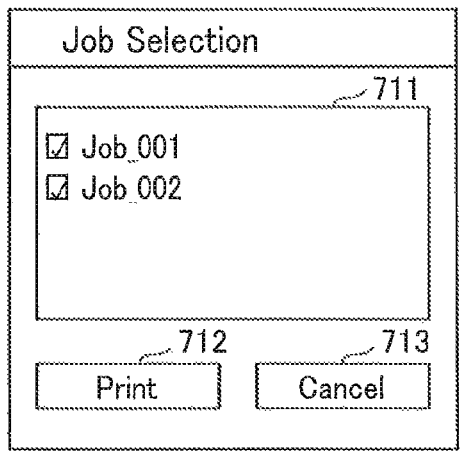
Fig. 9B
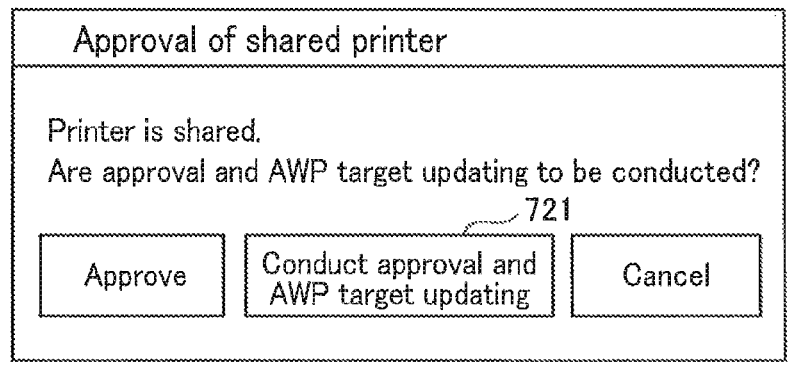

Fig. 9C1

Job List

| Job Name | Status | Output Target |
|---|---|---|
| Job_001 | Printing complete | AWP |
| Job_003 | Printing complete | MFP-01 |

Fig. 9C2

Job List

735

| Job Name | Status | Output Target |
|---|---|---|
| Job_001 | Printing complete | AWP (MFP-01) |
| Job_003 | Printing complete | MFP-01 |

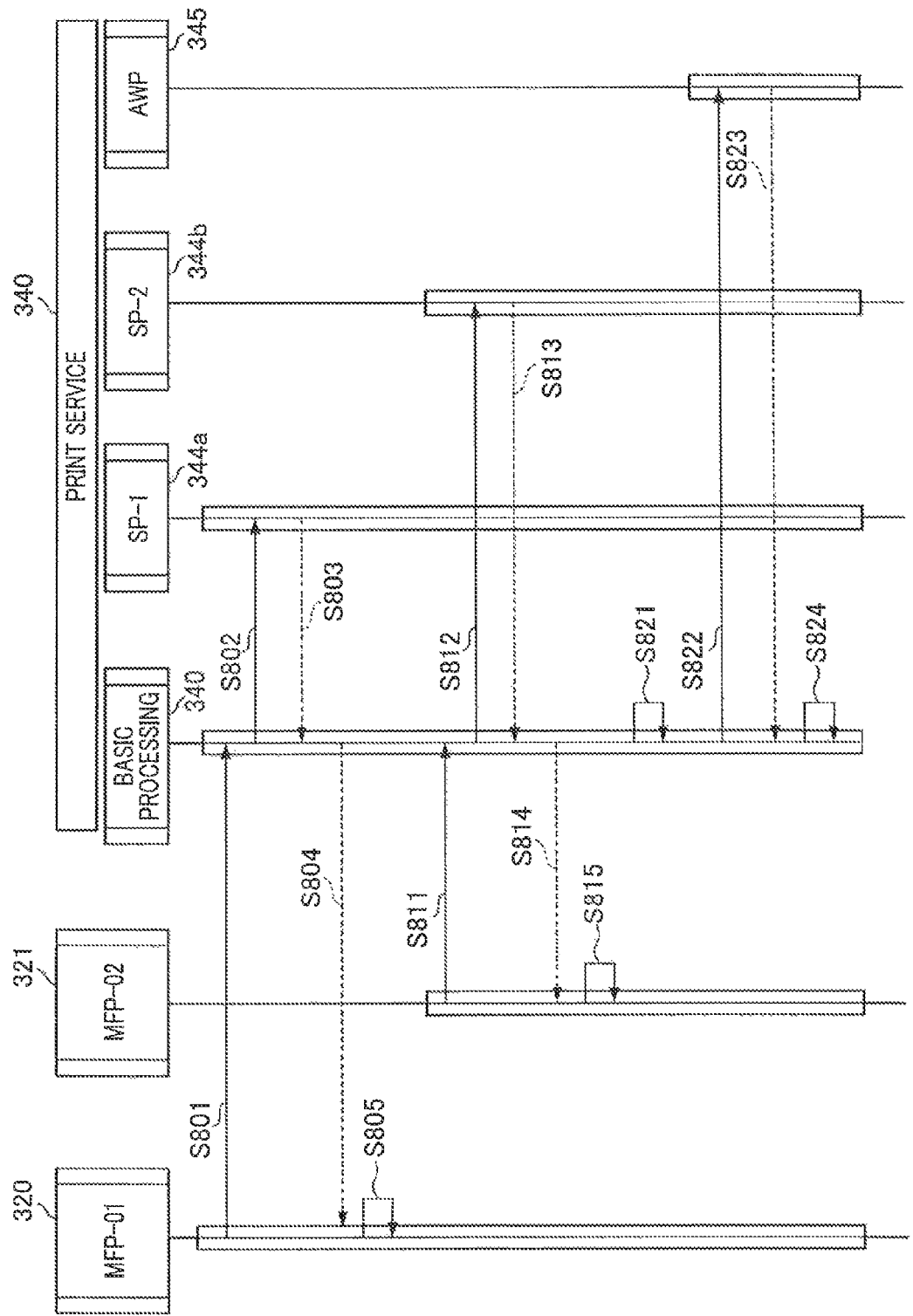

Fig. 23A

| 621 | 622 | 623 | 624 | 625 | 626 | 627 |
|---|---|---|---|---|---|---|
| SP ID | Printer Name | Printer Owner | RPID | Capabilities | Initial Print Setting Values | AWP Target Model |
| SP-1 | MFP-01 | UserX | RP-0001 | PC_1 | PT_1 | On |
| SP-2 | MFP-02 | UserX | RP-0002 | PC_2 | PT_2 | On |
| SP-AW | Anywhere Print | UserX | --- | PC_AW | PT_AW | --- |

Fig. 23B

| 631 | 632 | 633 | 634 | 635 | 636 | 637 | 638 | 639 |
|---|---|---|---|---|---|---|---|---|
| Job ID | Job Name | SP ID | Print Settings | Data Storage Location | Print Settings Storage Location | Job Owner | Job Status | Mode |
| JOB_001 | Doc-001 | AWP | PT_J1 | http://... | http://... | UserX | Queued | AWP |
| JOB_002 | Doc-002 | SP-1 | PT_J2 | http://... | http://... | UserX | Queued | Pull |
| JOB_003 | Doc-003 | SP-2 | PT_J3 | http://... | http://... | UserX | Queued | Push |

Fig. 23C

| 641 | 642 | 643 | 644 |
|---|---|---|---|
| Job ID | Job Name | Data Storage Location | Print Settings Storage Location |
| JOB_001 | Doc-001 | http://... | http://... |
| JOB_002 | Doc-002 | http://... | http://... |

Fig. 23D

| 641 | 642 | 643 | 644 |
|---|---|---|---|
| Job ID | Job Name | Data Storage Location | Print Settings Storage Location |
| JOB_001 | Doc-001 | http://... | http://... |

Fig. 23E

| 641 | 642 | 643 | 644 |
|---|---|---|---|
| Job ID | Job Name | Data Storage Location | Print Settings Storage Location |
| JOB_003 | Doc-003 | http://... | http://... |

Fig. 23F

| 631 | 632 | 633 | 634 | 635 | 636 | 637 | 638 | 639 |
|---|---|---|---|---|---|---|---|---|
| Job ID | Job Name | SP ID | Print Settings | Data Storage Location | Print Settings Storage Location | Job Owner | Job Status | Mode |
| JOB_001 | Doc-001 | AWP | PT_J1 | http://... | http://... | UserX | Queued | AWP |
| JOB_002 | Doc-002 | SP-2 | PT_J2 | http://... | http://... | UserX | Queued | Push |

Fig. 23G

| 641 | 642 | 643 | 644 |
|---|---|---|---|
| Job ID | Job Name | Data Storage Location | Print Settings Storage Location |
| JOB_001 | Doc-001 | http://··· | http://··· |

Fig. 23H

| 641 | 642 | 643 | 644 |
|---|---|---|---|
| Job ID | Job Name | Data Storage Location | Print Settings Storage Location |
| JOB_002 | Doc-002 | http://··· | http://··· |

Fig. 24A

| 621 | 622 | 623 | 624 | 625 | 626 | 627 | 628 | 629 |
|---|---|---|---|---|---|---|---|---|
| SPID | Printer Name | Printer Owner | RPID | Print Settings | Capabilities | AWP Target Model | Sharing Destination | Sharing Source |
| SP-1 | MFP-01 | AdminA | RP-0001 | PT 1 | PC 1 | - | UserX, Y | - |
| SP-2 | MFP-02 | AdminB | RP-0002 | PT 2 | PC 2 | - | UserX, Y | - |
| SP-AW | Anywhere Print | UserX | - | PT_AW | PC_AW | - | - | - |

Fig. 24B

| 621 | 622 | 623 | 624 | 625 | 626 | 627 | 628 | 629 |
|---|---|---|---|---|---|---|---|---|
| SPID | Printer Name | Printer Owner | RPID | Print Settings | Capabilities | AWP Target Model | Sharing Destination | Sharing Source |
| SP-AW | Anywhere Print | UserX | - | PT_AW | PC_AW | - | - | - |
| SP-1 | MFP-01 | UserX | RP-0001 | PT 1 | PC 1 | On | - | AdminA |
| SP-2 | MFP-02 | UserX | RP-0002 | PT 2 | PC 2 | On | - | AdminB |

Fig. 24C

| 631 | 632 | 633 | 634 | 635 | 636 | 637 | 638 | 639 |
|---|---|---|---|---|---|---|---|---|
| Job ID | Job Name | SPID | Print Settings | Data Storage Location | Print Settings Storage Location | Job Owner | Job Status | Mode |
| JOB_001 | Doc-001 | AWP | PT_J1 | http://.... | http://.... | UserX | Queued | AWP |
| JOB_002 | Doc-002 | SP-1 | PT_J2 | http://.... | http://.... | UserX | Queued | Pull |
| JOB_003 | Doc-003 | SP-1 | PT_J3 | http://.... | http://.... | UserX | Queued | Push |
| JOB_004 | Doc-004 | AWP | PT_J4 | http://.... | http://.... | UserY | Queued | AWP |
| JOB_005 | Doc-005 | SP-1 | PT_J5 | http://.... | http://.... | UserY | Queued | Pull |
| JOB_006 | Doc-006 | SP-1 | PT_J6 | http://.... | http://.... | UserY | Queued | Push |

Fig. 24D

| 641 | 642 | 643 | 644 |
|---|---|---|---|
| Job ID | Job Name | Data Storage Location | Print Settings Storage Location |
| JOB_001 | Doc-001 | http://••• | http://••• |
| JOB_002 | Doc-002 | http://••• | http://••• |

Fig. 24E

| 641 | 642 | 643 | 644 |
|---|---|---|---|
| Job ID | Job Name | Data Storage Location | Print Settings Storage Location |
| JOB_003 | Doc-003 | http://••• | http://••• |
| JOB_006 | Doc-006 | http://••• | http://••• |

Fig. 25A

| 631 | 632 | 633 | 634 | 635 | 636 | 637 | 638 | 639 | 640 |
|---|---|---|---|---|---|---|---|---|---|
| Job ID | Job Name | SP ID | Print Settings | Data Storage Location | Print Settings Storage Location | Job Owner | Job Status | Mode | User ID |
| JOB_001 | Doc-001 | AWP | PT_J1 | http://.... | http://.... | UserX | Queued | AWP | u001 |
| JOB_002 | Doc-002 | SP-1 | PT_J2 | http://.... | http://.... | UserX | Queued | Pull | u001 |
| JOB_003 | Doc-003 | SP-1 | PT_J3 | http://.... | http://.... | UserX | Queued | Push | u001 |
| JOB_004 | Doc-004 | AWP | PT_J4 | http://.... | http://.... | UserY | Queued | AWP | u002 |
| JOB_005 | Doc-005 | SP-1 | PT_J5 | http://.... | http://.... | UserY | Queued | Pull | u002 |
| JOB_006 | Doc-006 | SP-1 | PT_J6 | http://.... | http://.... | UserY | Queued | Push | u002 |

Fig. 25B

| 631 | 632 | 633 | 634 | 635 | 636 | 637 | 638 | 639 | 640 |
|---|---|---|---|---|---|---|---|---|---|
| Job ID | Job Name | SP ID | Print Settings | Data Storage Location | Print Settings Storage Location | Job Owner | Job Status | Mode | User ID |
| JOB_001 | Doc-001 | AWP | PT_J1 | http://... | http://... | UserX | Queued | AWP | u001 |
| JOB_002 | Doc-002 | SP-1 | PT_J2 | http://... | http://... | UserX | Queued | Pull | u001 |
| JOB_004 | Doc-004 | AWP | PT_J4 | http://... | http://... | UserY | Queued | AWP | u002 |
| JOB_005 | Doc-005 | SP-1 | PT_J5 | http://... | http://... | UserY | Queued | Pull | u002 |

Fig. 25C

| 631 | 632 | 633 | 634 | 635 | 636 | 637 | 638 | 639 | 640 |
|---|---|---|---|---|---|---|---|---|---|
| Job ID | Job Name | SP ID | Print Settings | Data Storage Location | Print Settings Storage Location | Job Owner | Job Status | Mode | User ID |
| JOB_001 | Doc-001 | AWP | PT_J1 | http://... | http://... | UserX | Queued | AWP | u001 |
| JOB_004 | Doc-004 | AWP | PT_J4 | http://... | http://... | UserY | Queued | AWP | u002 |

Fig. 25D

| 641 | 642 | 643 | 644 |
|---|---|---|---|
| Job ID | Job Name | Data Storage Location | Print Settings Storage Location |
| JOB_001 | Doc-001 | http://··· | http://··· |
| JOB_002 | Doc-002 | http://··· | http://··· |

Fig. 25E

| 641 | 642 | 643 | 644 |
|---|---|---|---|
| Job ID | Job Name | Data Storage Location | Print Settings Storage Location |
| JOB_003 | Doc-003 | http://··· | http://··· |
| JOB_006 | Doc-006 | http://··· | http://··· |

Fig. 26A

| | | Push | Pull |
|---|---|---|---|
| SP1 | UserX | Job-01 | Job-11 |
| | UserY | Job-02 | Job-12 |
| SP2 | UserX | Job-03 | Job-13 |
| | UserY | Job-04 | Job-14 |
| AWP | UserX | — | Job-15 |
| | UserY | — | Job-16 |

Fig. 26B

| Job Information Request | Meaning | Acquisition Result |
|---|---|---|
| /fetch(SP1, push)<br>/fetch(SP1) | Acquisition of SP1 push jobs | Job-01, 02 |
| /fetch(SP1, pull) | Acquisition of SP1 pull jobs | Job-11, 12 |
| /fetch(UserX, pull)<br>/fetch(UserX) | Acquisition of all pull jobs of User X | Job-11, 13, 15 |
| /fetch(SP1, UserX, pull)<br>/fetch(SP1, UserX) | Acquisition of pull jobs of User X from SP1 (acquisition from AWP as well) | Job-11, 15 |

INFORMATION PROCESSING APPARATUS, PRINT SYSTEM, CONTROL METHOD FOR INFORMATION PROCESSING APPARATUS, AND STORAGE MEDIUM

This application is a national stage application under 35 U.S.C. §371 of International Application No. PCT/JP2013/002995, having an International filing date of May 9, 2013, which claims priority to Japan 2012-109872, filed on May 11, 2012, the contents of each of which are incorporated by reference as if set forth in full herein.

TECHNICAL FIELD

The present invention relates to an information processing apparatus, a print system, a control method for an information processing apparatus, and a storage medium.

BACKGROUND ART

There is a print system in which a print instruction is transmitted from a client to a server, and the server that receives the print instruction converts the content for printing to print data. In recent years, attention has been focused on the concept of cloud computing, and as with the aforementioned system, this can also be understood as one mode whereby a server provides a service to a client. A main feature of cloud computing is that data conversion and data processing are executed in a distributed manner using many computing resources so as to process requests from many clients in a simultaneous manner. At present, vendors provide various types of services in a disorderly manner by implementing web services in a cloud computing environment to realize cloud computing.

Vendors that provide services in a cloud computing environment include notable vendors such as Google®. Google® has not only established many large-scale data centers but also shows active movements, for example, Google® cooperates with devices and is developing a data communication structure between devices and services. For example, Google® has developed a mechanism for data communication designed to provide services in conjunction with image forming apparatuses, and has publicly disclosed interfaces designed for image forming apparatuses to conduct data communication in a cloud computing environment prepared by Google®. By installing this interface in image forming apparatuses, it is possible for a client to designate an image forming apparatus to conduct printing, even if the image forming apparatus and the server are connected via the Internet. This is called a cloud print system.

If a client device is at least provided with a web browser, a cloud print system can be used. Consequently, print instructions can be issued not only from one's own client terminal, but also from a terminal of one's choice such as a conference room, a field office, or a mobile device. As a result, a cloud print system is not only effective for individual use, but also for office use.

In the case of office use, it is frequently the case that an image forming apparatus is shared by multiple users, and it is frequently the case that each user is capable of using multiple image forming apparatuses. Consequently, in addition to the push printing function that is normal printing, there are also many environments in which a pull printing function or anywhere printing function may also be used. Anywhere printing is a print mode in which a user issues a print instruction from an application without determining the image forming apparatus, and then output is conducted from a desired image forming apparatus. With respect to a system provided with the image forming apparatuses disclosed in Patent Document 1, a list of output targets for print data is presented to a user device, a settings screen display pertaining to an image forming apparatus is modified in response to non-selection of specific output targets by the user device, and the print data selected by user operation is output. By means of this processing, the system disclosed in Patent Document 1 carries out an anywhere printing function and pull printing.

CITATION LIST

Patent Literature

Patent Document 1: Japanese Patent Application Laid-Open No. 2009-054006

However, Patent Document 1 gives no consideration to an anywhere printing function in a cloud print system. That is, with cloud printing, an image forming apparatus must be selected when issuing a print instruction with a web application. This is inconvenient for users who actually wish to output printed material afterwards from a conference room, when on-the-go, or the like.

SUMMARY OF INVENTION

The information processing apparatus of the present invention performs printing from an image forming apparatus that actually executes printing, after issuing a print instruction in a cloud environment without selecting a specific image forming apparatus by user interface.

The information processing apparatus of a first embodiment of the present invention is an information processing apparatus that receives data from a service providing apparatus that provides a web service in response to a print instruction issued by a user who utilizes the web service, and that provides an image forming apparatus via a network with a job for printing that is generated based on the received data. The information processing apparatus includes management means for managing a first printer object that has a correspondence relationship with the image forming apparatus, and a second printer object that does not have a correspondence relationship with the image forming apparatus; and transmission means for holding the job without transmitting the job to a specific image forming apparatus when the second printer object is selected and a print instruction is issued, and transmitting, to the image forming apparatus, the job held by the second printer object in response to an access from the image forming apparatus to the first printer object.

According to the information processing apparatus of the present invention, it is possible to perform printing from an image forming apparatus that actually executes printing, after issuing print instructions in a cloud environment without selecting a specific image forming apparatus by user interface. It is possible to select all the print modes of push printing, pull printing, and anywhere printing, and the degree of freedom of print system construction in the cloud environment is high.

Further features of the present invention will become apparent from the following description of exemplary embodiments with reference to the attached drawings.

BRIEF DESCRIPTION OF DRAWINGS

FIG. 3 shows a software configuration of each device and each server group.

FIG. 4A illustrates UIs.

FIG. 4B1 illustrates UIs.

FIG. 4B2 illustrates UIs.

FIG. 4B3 illustrates UIs.

FIG. 5C1 illustrates UIs of a management screen.

FIG. 5C2 illustrates UIs of a management screen.

FIG. 6A illustrates various notification information recorded in XML.

FIG. 6B illustrates various notification information recorded in XML.

FIG. 6C illustrates various notification information recorded in XML.

FIG. 6D illustrates various notification information recorded in XML.

FIG. 6E illustrates various notification information recorded in XML.

FIG. 7F illustrates various notification information recorded in XML.

FIG. 7G1 illustrates various notification information recorded in XML.

FIG. 7G2 illustrates various notification information recorded in XML.

FIG. 7G3 illustrates various notification information recorded in XML.

FIG. 7G4 illustrates various notification information recorded in XML.

FIG. 7G5 illustrates various notification information recorded in XML.

FIG. 7G6 illustrates various notification information recorded in XML.

FIG. 7H1 illustrates various notification information recorded in XML.

FIG. 7H2 illustrates various notification information recorded in XML.

FIG. 7H3 illustrates various notification information recorded in XML.

FIG. 8A illustrates management tables stored by various devices.

FIG. 8B illustrates management tables stored by various devices.

FIG. 8C illustrates management tables stored by various devices.

FIG. 8D illustrates management tables stored by various devices.

FIG. 8E illustrates management tables stored by various devices.

FIG. 9A illustrates UIs.

FIG. 9B illustrates UIs.

FIG. 9C1 illustrates UIs.

FIG. 9C2 illustrates UIs.

FIG. 10 illustrates processing which registers an image forming apparatus in a print service in Embodiment 1.

FIG. 23A illustrates management tables stored by each device in Embodiments 1 and 2.

FIG. 23B illustrates management tables stored by each device in Embodiments 1 and 2.

FIG. 23C illustrates management tables stored by each device in Embodiments 1 and 2.

FIG. 23D illustrates management tables stored by each device in Embodiments 1 and 2.

FIG. 23E illustrates management tables stored by each device in Embodiments 1 and 2.

FIG. 23F illustrates management tables stored by each device in Embodiments 1 and 2.

FIG. 23G illustrates management tables stored by each device in Embodiments 1 and 2.

FIG. 23H illustrates management tables stored by each device in Embodiments 1 and 2.

FIG. 24A illustrates management tables stored by each device in Embodiment 3.

FIG. 24B illustrates management tables stored by each device in Embodiment 3.

FIG. 24C illustrates management tables stored by each device in Embodiment 3.

FIG. 24D illustrates management tables stored by each device in Embodiment 3.

FIG. 24E illustrates management tables stored by each device in Embodiment 3.

FIG. 25A illustrates management tables stored by each device in Embodiment 5.

FIG. 25B illustrates management tables stored by each device in Embodiment 5.

FIG. 25C illustrates management tables stored by each device in Embodiment 5.

FIG. 25D illustrates management tables stored by each device in Embodiment 5.

FIG. 25E illustrates management tables stored by each device in Embodiment 5.

FIG. 26A illustrates tables used in Embodiment 5.

FIG. 26B illustrates tables used in Embodiment 5.

DESCRIPTION OF EMBODIMENTS

Figure 1:
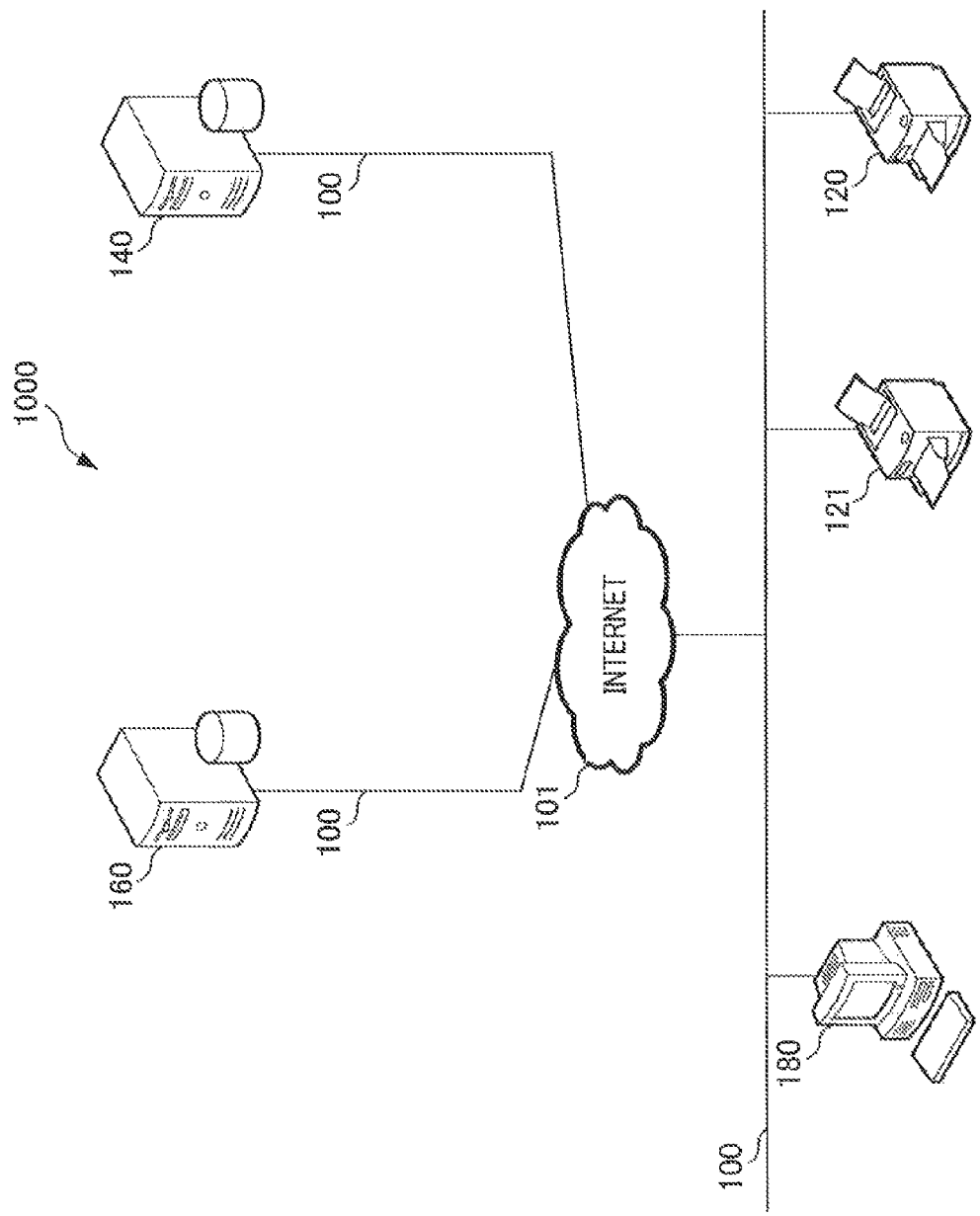
FIG. 1 shows an exemplary print system configuration of an embodiment of the present invention.

The problems to be solved by the present invention are now described in further detail. In Patent Document 1, no consideration is given to an anywhere printing function for use in a print system that takes account of a cloud environment. Specifically, the following problems exist.

First, to begin with, a receiving unit for anywhere printing instructions does not exist in current cloud print systems. In Patent Document 1, "A specific model is not selected (=a general-purpose driver is used)" is offered, but such a designation cannot be made in a cloud print system. With a cloud print service, a user first registers the image forming apparatuses in the print service to enable their use. At that time, in the print service, an instance is created that is called a service printer (SP), and that serves to select an image forming apparatus. This corresponds to the printer queue in the printing system of Windows®. Apart from a printer queue, the SP also includes information concerning functions of the image forming apparatus that are called capabilities, and is defined as a printer object. When issuing a print instruction from an application, the user designates this SP to select an image forming apparatus. With current cloud print services, as there is a one-to-one correspondence between an actual image forming apparatus and an SP in this manner, no SP is offered for selecting an unspecified image forming apparatus. Consequently, a receiving unit for issuing anywhere printing instructions does not itself exist.

Secondly, with current cloud print systems, a print job that is spooled in a given SP cannot be obtained and executed by another image forming apparatus not associated with that SP. As stated above, as each SP has a one-to-one correspondence with an actual image forming apparatus, the output target is limited to the image forming apparatus that is associated with the SP selected by the user at the time of printing. Consequently, as recorded in Patent Document 1, a job saved in another SP cannot be acquired even if a pull print request is issued from an image forming apparatus. That is, even supposing that an SP for anywhere printing could be created, it would not be possible for an image forming apparatus to issue a pull print request to the SP used for anywhere printing.

Thirdly, with current cloud print systems, it is not possible to conduct printing by selecting only jobs linked to user information. In a cloud print system, when an image forming apparatus is registered in a print service, it is registered with linkage to the user's account. In short, an image forming apparatus can be used only by the user who registered the image forming apparatus. By sharing the SP created by this user operation, other users can also print with the image forming apparatus. However, as regards the respective jobs, only those spooled in the spooler of the printer owner are successively printed. When a pull print request is issued, all jobs that have been spooled up to that point are acquired. Consequently, it is not possible to conduct pull printing of only jobs of a specific user. In Patent Document 1, only jobs linked to user information are subjected to pull printing, but this is impossible in a cloud print system.

Fourthly, with current cloud print systems, even supposing that it were possible to transmit user information to a print service, there would be security issues. With respect to Patent Document 1, the user is identified by transmitting user information when a pull print request is issued, and there are no security issues, because the server is within an intranet. However, with a cloud print system, it is risky to send user information, because the pull print request is issued via the Internet.

The invention of the present application is an invention that solves at least one of the aforementioned problems, and may also solve the problem of anywhere printing in a cloud print system that is not recorded here.

The terms used in the present invention are now defined. Push printing is the most common print mode, and conducts non-stop processing until paper is output from the image forming apparatus according to a print instruction issued by a user with an application.

Pull printing is also called temporarily stored printing, and temporarily stores jobs (print data) on a server and within the body of an image forming apparatus. Temporarily stored jobs are printed out by an actual printing output by means of an output instruction issued by a user from an image forming apparatus. It is a superior printing method from the security standpoint, because it outputs the printed material in front of one the user, and because it reduces the risk that another user would see the content thereof or inadvertently carry it off. The act of issuing an output instruction from a printer panel or the like is referred to as a pull print request.

As stated above, anywhere printing is a print mode in which the user issues a print instruction from an application without determining the image forming apparatus, and then output is conducted from a desired image forming apparatus. The job generated by the print instruction is temporarily stored on the server. When the user logs in with an image forming apparatus, and issues a pull print request, the image forming apparatus submits an inquiry to the server, and acquires and prints the job linked to the logged in user. Therefore, pull printing includes the two print modes of temporarily stored printing and anywhere printing. By constructing in advance a system which links image forming apparatuses and a server, output is possible from any image forming apparatus within the system. By means of this function, output of meeting materials can be conducted from an image forming apparatus in a conference room or a field office, and a salesman can conduct printing of sales materials on-the-go from an image forming apparatus of a convenience store. By this means, there is no need to carry around printed materials, and it is possible to output the required portion at the required time from the nearest image forming apparatus.

A "job" combines the print data acquired from an application, and the print settings established by a user. "Job information" refers to the storage location and attribution of the print data and print settings.

A "Print job" is a rendering of a job (print data and print settings) that is converted to a format suited to the respective image forming apparatus. Ordinarily, it is a PDL (Page Description Language) and image data.

A "Pull job" refers to a job that is spooled in accordance with a pull print instruction. A "Push job" refers to a job that is spooled in accordance with a push print instruction. When a pull print request is issued from the body of an image forming apparatus that has been selected as a target, the job is downloaded, and printed.

An "AWP job" refers to a job that is spooled in accordance with an anywhere printing instruction. After issuing a print instruction by a user without selection of a specific image forming apparatus, when a pull request is issued from the body of any image forming apparatus that has been registered in the system, the job is downloaded to that image forming apparatus, and printed. An AWP job is a type of pull job.

(Embodiment 1)

FIG. 1 is a drawing which shows the configuration of a print system 1000. The print system 1000 includes a client 180, and one or more image forming apparatuses 120 (and 121, etc.). The two devices are devices that are set up in a user environment, and are interconnected via a network 100, and the network 100 is connected to an Internet 101. The client 180 and the image forming apparatus 120 may also be interconnected via the Internet 101. In addition, the print system 1000 includes a print server group 140, and a web application server group 160. The two server groups may also be provided by the same vendor. In such cases, the two server groups may be connected via the network 100. The respective devices and server groups configuring the print system 1000 can be connected via the Internet 101, and can conduct data communication with each other. Otherwise, each device consists of only one unit, but multiple units are also acceptable. Each server group is configured with multiple units, but one unit is also acceptable.

Figure 2:
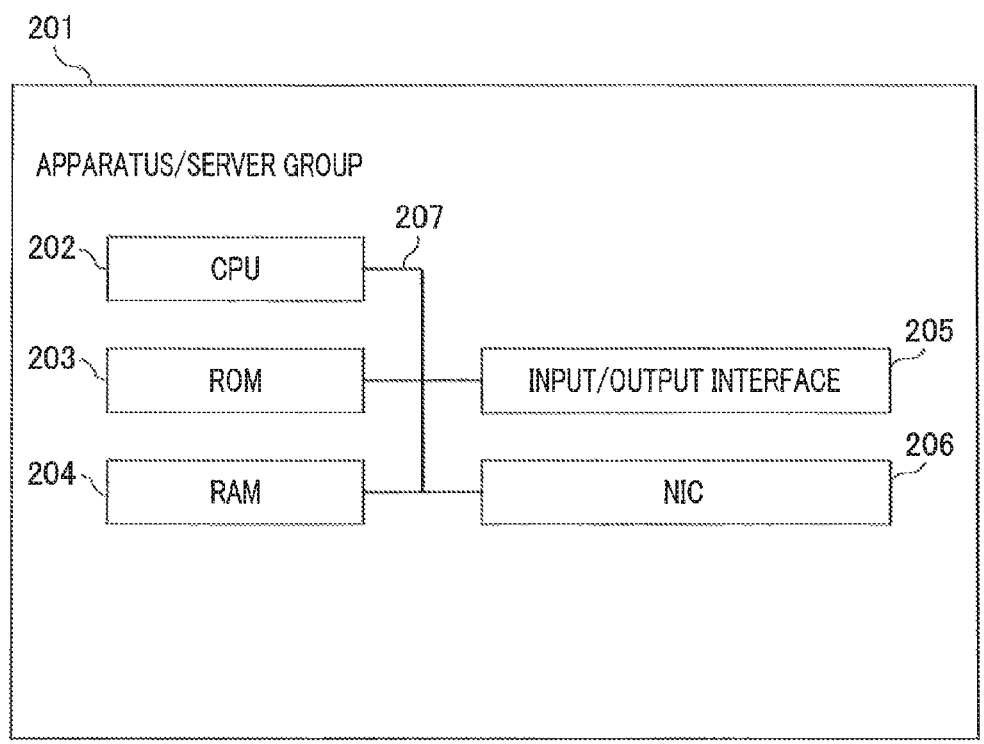
FIG. 2 shows a hardware configuration of devices and server groups configuring a print system.

Next, a description is given of a hardware configuration of the respective devices and the respective server groups configuring the print system 1000. FIG. 2 is a drawing which illustrates a hardware configuration of the respective devices and the respective server groups configuring the print system 1000. Reference number 201 signifies the respective devices and the respective server groups configuring the print system 1000. A CPU (central processing unit) 202 is a unit which runs the various programs, and which carries out diverse functions. A ROM (read-only memory) 203 is a unit which stores the various programs. A RAM (random access memory) 204 is a storage unit that functions as a temporal working storage region for the CPU 202. The CPU 202 loads a program stored in the ROM 203 into the RAM 204 to run it.

An input/output interface 205 is an interface unit which not only transmits data to a display (not illustrated in the drawing) connected to the respective devices and the respective server groups, but which also receives data from a pointing device (not illustrated in the drawing). An NIC (network interface card) 206 is a unit for connecting the respective devices and the respective server groups configuring the print system 1000 to the network 100. The units described above are capable of receiving and transmitting data via a bus 207. In addition, a printing unit (not illustrated in the drawing) is installed in the image forming apparatus 120, and the printing unit is capable of receiving and transmitting data from/to the various units via the bus 207. Otherwise, the printing unit is a unit capable of printing image data such as a raster image on a recording medium such as recording paper.

FIG. 3 illustrates a software configuration of the respective devices and the respective server groups configuring the print system 1000. A program for executing the respective functions of the software configuration illustrated in FIG. 3 is stored in the ROM 203 of each device and each server group, and the CPU 202 loads the program into the RAM 204 to run it, thereby carrying out these functions.

A description is given below of the functions carried out by the respective devices and the respective server groups. Description of the functions is roughly divided into the two parts of a first half and a second half. First, in the first half, a description is given of the basic functions composed of the two systems of the respective devices and the respective server groups. Next, in the second half, the basic functions composed of the two systems are developed, and a description is given of advanced functions characteristic of the present invention that serve to carry out an anywhere printing function.

The features of the basic functions described in the first half are, first, that a user who registers an image forming apparatus in a print service, and who uses a web service selects a registered image forming apparatus when printing from a web application, and executes printing. The image forming apparatus is linked to user information, and can conduct the same operations with any terminal having a web browser.

In addition, the basic functions can be applied to either a push printing or a pull printing configuration. Push printing is printing which conducts non-stop processing until paper is output from the image forming apparatus according to a print instruction issued by a user on a web browser. Pull printing is printing in which a job is temporarily stored on the server or within the body of an image forming apparatus, and the stored job is output by a pull print request from the image forming apparatus.

In contrast, the feature of the advanced functions described in the second half is that an anywhere printing function can be executed. An anywhere printing function is executed by temporarily storing a job on a server, issuing a job request to the server from an image forming apparatus in response to a user instruction of the image forming apparatus, and outputting the downloaded job.

With respect to the first half portion of these, a description is given of the basic functions of the two systems. The functions classified under a first system are functions classified under a registration system in which the image forming apparatus 120 is registered in a print service 340. The functions classified under a second system are functions classified under a print system in which print data produced by the print server group 140 is printed by the image forming apparatus 120. In Embodiment 1, the description concerns the case where the user who registers the image forming apparatus 120 in a print service is identical to the user who executes printing.

Initially, FIG. 3 is used to describe functions of a registration system that is the first system. First, the operations of the image forming apparatus 120 are described. In registration processing, a print control unit 320 of the image forming apparatus 120 carries out various processing steps in order to render the image forming apparatus 120 usable in the print service 340.

The print control unit 320 is provided with an operating unit 321, a control unit 322, a printer information storage unit 323, a printer registration transmission unit 324, a user information storage unit 325, a print job generation unit 334, and a print execution unit 335. The print control unit 320 is also provided with a job information receiving unit 331, a print data acquisition unit 332, and a print settings acquisition unit 333. The operating unit 321 displays various operational screens. In registration processing, the operating unit 321 displays a UI (user interface) illustrated in FIG. 4A in order to register the image forming apparatus 120 in the print service 340. Otherwise, it may be arranged to enable input of the URL of the print service 340. In Embodiment 1, the URL employs an internally recorded value. In the screen illustrated in FIG. 4A, the user inputs a user ID 411 and the password 412 in order to log into the print service 340, and the operating unit 321 instructs the control unit 322 to conduct a registration operation when a registration execution button 413 is pressed. The control unit 322 acquires the registration information of the image forming apparatus that is required for registration from the printer information storage unit 323.

The registration information required for registration includes an RPID, a printer name, capabilities, and initial print setting values. RPID (real printer ID) is specific identification information assigned to the image forming apparatus 120. The various image forming apparatuses including the image forming apparatus 120 are respectively assigned specific identification information, and each image forming apparatus is identified by this identification information. As specific identification information, for example, a Mac address or the like may be used, but one is not limited thereto. A printer name is a name assigned to the image forming apparatus 120, and is used to designate the image forming apparatus 120. The printer name is different from the identification information, and the same printer name may be given to all image forming apparatuses.

Capabilities are, for example, information concerning the print functions of the image forming apparatus, including information about whether or not the image forming apparatus 120 can conduct double-sided printing, whether or not it can conduct color printing, paper sizes that can be output, and the like. The capabilities can be represented in XML format as shown in FIG. 6A. Each <Item> indicates an ability of the image forming apparatus 120, indicating that the image forming apparatus 120 is capable of double-sided printing, is capable of color output, and is capable of outputting paper of B5, A3, and A4 sizes. As shown in FIG. 6B, the initial print setting values can be represented in XML format, and are a subset of the capabilities shown in FIG. 6A in a state where any one <Item> of each function is selected. In the example of FIG. 6B, this signifies that one-sided output, color output, and A4 size are set.

FIG. 8A is a drawing which illustrates information stored by the printer information storage unit 323, wherein the RPID corresponds to 611, the printer name to 612, capabilities to 613, and initial print setting values to 614. An SPID 615 and a pull-use SP ID 616 are described below.

The control unit 322 issues instructions to the respective processing units, and controls the respective processing steps. The control unit 322 delivers the registration information of the image forming apparatus acquired from the printer information storage unit 323 and the log-in information acquired from the operating unit 321 to the printer registration transmission unit 324, and commands the registration processing of the image forming apparatus. The printer registration transmission unit 324 communicates with the print service 340 in order to register the image forming apparatus 120 in the print service 340. The printer registration transmission unit 324 logs into the print service 340 using the log-in information received from the control unit 322. After successful log-in, so long as there is no particular refusal, a state is maintained wherein a session is conducted by the account of the log-in user between the image forming apparatus 120 and the print service 340. Next, the printer registration transmission unit 324 issues an image forming apparatus registration request to the print service 340 based on the received registration information. FIG. 6D is one example of registration request information with respect to the print service 340. A printer name 541, an RPID 542, capabilities 543, and print settings 544 are included in the information that is recorded in XML.

Next, a description is given of the operations of the print server group 140 that functions as the information processing apparatus of the present embodiment. The print service 340 of the print server group 140 is provided with a printer registration receiving unit 341, a control unit 342, a printer information management unit 343, an SP 344, and an AWP 345. The print service 340 is also provided with a printer information presentation unit 346, a print instruction receiving unit 347, a job information acquisition unit 348, and a job information management unit 349. The print service 340 is also provided with a job information presentation unit 351, a print data storage unit 352, a print settings storage unit 353, and a communication unit 354. The print service 340 receives an image forming apparatus registration request, and creates a service printer that can be selected from an application. When the printer registration receiving unit 341 receives a request for registration of the image forming apparatus 120 and its registration information from the printer registration transmission unit 324, it sends the registration information to the control unit 342. The control unit 342 instructs the printer information management unit 343 to register the image forming apparatus, and to manage the registration information.

The printer information management unit 343 creates a service printer (SP) 344 corresponding to the image forming apparatus for which a registration request was made based on the acquired registration information, and issues a unique ID (SPID) for each service printer. This service printer 344 is uniquely generated for each requested image forming apparatus, and for each user account. Therefore, even with respect to the same image forming apparatus, different service printers 344 would be generated by user if different users register it. When an image forming apparatus of the print service 340 is selected at the time of printing, the print service 340 uses this SPID to identify the target image forming apparatus. In other words, a SP is a printer object, and is an aggregate of information whereby a user using the print server group 140 recognizes the image forming apparatus 120. In addition to presenting printer information by utilizing SP information, the print server group 140 is capable of communicating with the image forming apparatus 120. Consequently, a user can cause an image forming apparatus to output printed material by selecting the SP.

Hereafter, in the case where multiple different SPs are to be distinguished, they are denoted as 344a, 344b. The service printer 344 may be logically understood as an independent image forming apparatus, and it may have actual existence as a package, or it may have a virtual existence that is programmatically processed.

The printer information management unit 343 associates and stores the user ID, SPID, printer name, capabilities, and print settings. FIG. 8B illustrates an example of a printer DB held by the printer information management unit 343. The printer DB has a printer name 622, a printer owner 623, an RPID 624, capabilities 625, and initial print setting values 626. The printer DB also has an AWP target model 627, sharing destination 628, and sharing source 629. The AWP target model 627, sharing destination 628, and sharing source 629 are not used here, and are described below.

The SPID issued by the printer information management unit 343 is transmitted to the printer registration transmission unit 324 via the control unit 342 and the printer registration receiving unit 341. The printer registration transmission unit 324 receives the SPID from the print service 340 in response to the registration request. FIG. 6E is one example thereof, and illustrates that information is recorded in XML, and a SPID 551 that corresponds to an image forming apparatus is assigned.

The printer registration transmission unit 324 transmits the received SPID to the control unit 322, and the control unit 322 transmits the same information to the printer information storage unit 323. The printer information storage unit 323 stores the SPID with linkage to the printer information. The SPID 615 of FIG. 8A illustrates a state where storage is conducted with linkage to the printer information. The foregoing has been a description of functions of a registration system that is a first system.

Next, FIG. 3 is used to describe functions classified under a print system that is a second system. Initially, a description is given of functions of the client 180. The client 180 has a web browser 380. The web browser 380 transmits print instructions whose contents are saved in the web application server group 160 to the web application server group 160. The web browser 380 also receives an access command, i.e., a redirect instruction to access the print server group 140 from the web application server group 160, and accesses the print server group 140 according to the received redirect instruction. From the print server group 140, the web browser 380 acquires and displays a list of image forming apparatuses that the user who is utilizing the web browser 380 can use for printing, as well as a print settings screen corresponding to the respective image forming apparatus. FIG. 4B1 is one example of a print settings screen that is displayed by the web browser 380, and that corresponds to an image forming apparatus selected by the user. The web browser 380 also transmits the image forming apparatus and the print settings established by the user in the print settings screen to the print server group 140. The foregoing is a description of the web browser 380 of the client 180.

Next, a description is given of the functions of the web application server group 160 that functions as the service providing apparatus of the present embodiment. The web application server group 160 has a web application 360. The web application 360 provides a document creation service. In the case where, for example, a user wishes to distribute materials at a company meeting, a document creation service is utilized to create the materials. In the case where the client 180 uses the web application 360, there is no need to install the application in the client 180, and it is sufficient if the client 180 has the web browser 380. The web application 360 transmits the screen information for creation of the materials to the web browser 380. The web application 360 conducts authentication based on user information including user ID and password that are input by the user via the web browser 380, and sends the screen information for creation of the materials in response to successful authentication. The web browser 380 that has received the screen information displays a preparation screen for creating documents based on the screen information, and the user creates the materials to be distributed at the meeting using the preparation screen. The web application 360 receives the information for the materials created by the user using the preparation screen, creates content based on the received information, and stores the created content in a memory device of the web application server group 160. Note that the web application 360 is not limited to a document creation service, and may also provide a mail service or a scheduling service.

A user who wishes to print the content that was created using the document creation service presses a print button displayed on the preparation screen (not illustrated in the drawings). The web application 360 receives the information that the print button was pressed, and transmits the print server group 140 an access command, i.e., the redirect instruction to the web browser 380. The redirect instruction includes a request for acquiring the aforementioned list corresponding to the user who is using the web browser 380, as well as content identification information for identifying the content to be printed pursuant to user instruction and user information. In the case where there is a content acquisition request from the print server group 140, the web application 360 transmits the pertinent content to the print server group 140 based on the content identification information for identifying content that was sent together with the acquisition request. Otherwise, the web application 360 may also have a configuration wherein an inquiry is made directly to the print server group 140 without the intermediary of the web browser 380 to transmit a request or the like for acquiring the list corresponding to the user. The foregoing is a description of the web application 360 of the web application server group 160.

Next, a description is given of functions of the print system of the print service 340. The print service 340 acquires print data from the web application, and transmits the job to the image forming apparatus 120 in response to a request from the image forming apparatus 120. The printer information presentation unit 346 of the print service 340 transmits the list to the web browser 380 in response to a list acquisition request received from the web browser 380. The printer information presentation unit 346 specifies the SPID and the printer name stored by the printer information management unit 343 based on the user information. The printer information presentation unit 346 then acquires information about the image forming apparatuses that can be employed by the user from the printer information management unit 343, and generates the list. The printer information presentation 346 also receives the SPID of the image forming apparatus selected by the user from the list. The printer information presentation 346 specifies the capabilities stored by the printer information management unit 343 based on the received SPID, generates the print settings screen, and transmits the generated print settings screen to the web browser 380. It also specifies the initial print setting values stored by the printer information management unit 343 based on the received SPID, and uses these as the initial setting values.

The printer information presentation unit 346 generates the print settings screen from the capabilities information shown in FIG. 6A. The respective functions 421 displayed on the print settings screen shown in FIG. 4B1 correspond to the print settings recorded in the capabilities. The print instruction receiving unit 347 receives the SPID and the print settings set by the user via the print settings screen from the web browser 380. When the web browser 380 conducts accessing based on the redirect instruction, the print instruction receiving unit 347 also receives the content identification information that serves to identify the content for which the user has issued a print instruction.

The job information acquisition unit 348 receives the content identification information from the print instruction receiving unit 347, and acquires the content for printing from the web application 360 based on the received content identification information. The job information acquisition 348 also receives the print settings that were input by the user and the SPID corresponding to the image forming apparatus selected by the user from the print instruction receiving unit 347. The print settings are recorded in XML format as in FIG. 6C. According to FIG. 6C, it is clear that the user has set double-sided printing, monochrome, and paper size A4. Otherwise, the job information acquisition unit 348 may convert the content to print data as necessary, based on the content and the print settings acquired from the web application 360.

The job information acquisition unit 348 issues an instruction to the SP 344 corresponding to the acquired SPID to spool the acquired job. Now, in the case where the SP 344 actually exists, the respective SP may conduct spool processing, but the description given here concerns the method of managing all jobs by a table. When hereinafter denoted by "spooled file," this may refer to either a job file possessed by an actually existing respective SP, or to a job file that is programmatically distinguished by the control unit 342.

The control unit 342 acquires the print data, print settings, and SPID from the job information acquisition unit 348. A communication module 350 is capable of conducting communication with the image forming apparatus 120 that has a communication module 330, and is an interface for two-way data communication. The communication module 350 of the print service 340 has the job information presentation unit 351, the print data storage unit 352, and the print settings storage unit 353. The print data storage unit 352 receives and stores the print data from the control unit 342. The print settings storage unit 353 receives and stores the print settings from the control unit 342. The control unit 342 issues an instruction to the job information management unit 349 to store the job information upon receiving notification from the print data storage unit 352 and the print settings storage unit 353 that storage has been completed.

FIG. 8C is a drawing which illustrates information stored by the job information management unit 349, wherein a job ID corresponds to 631, a job name to 632, an SPID to 633, print settings to 634, a print data storage location (URL, etc.) to 635, and a print settings storage location to 636. As the print settings 634 are identical to the print settings stored in the print settings storage location 636, they do not need to be included. Here, the print settings have been directly added to the management table for convenient handling, because the frequency of use is high.

A job owner 637 stores information concerning the user who issued the job print instruction. As there is a single user in Embodiment 1, only a User X is stored. A job status 638 stores the status of the job. For example, it is possible to set QUEUED for the state where a job is saved in the print service, SPOOLED for the state where it has been downloaded by the image forming apparatus 120, DONE for the state where printing has been normally conducted, ERROR for the state where printing cannot be conducted due to error, and the like. A mode 639 and a user ID 640 are described in detail below.

The control unit 342 also issues an information notification instruction to the job information presentation unit 351. The job information presentation unit 351 transmits notification information A indicating that the print data has been prepared to the image forming apparatus 120. The notification information A can be represented in XML format as shown in FIG. 7H1. Here, as it is sufficient to convey that job preparation has been completed to the image forming apparatus that is the output target, the SPID alone is sent.

From here onward, processing differs depending on whether the image forming apparatus 120 operates as a push print device, or whether it operates as a pull print device. First, the case is described where the image forming apparatus 120 operates as a push print device.

The job information receiving unit 331 of the print control unit 320 issues a job information request to the print service 340 in response to receipt of the notification information A issued by the job information presentation unit 351. This is a request which is made to the SP 344 that was generated by a registration request of the image forming apparatus 120, and which acquires the job(s) spooled in the SP 344. In the job information request, the SPID is designated by using the SPID as an argument as shown in FIG. 7G1. This SPID is also managed as in FIG. 8A, but the SPID contained in FIG. 7H1 may be used here.

The job information presentation unit 351 creates the job information upon receiving a job information request from the job information receiving unit 331. The job information presentation unit 351 acquires the print data storage location and the print settings storage location from the job information management unit 349 via the control unit 342, and generates notification information B. Taking the job illustrated in FIG. 8C as an example, the information used to generate the notification information B is constituted by the job ID 631, the job name 632, the data storage location 635, and the print settings storage location 636. FIG. 8D shows an extraction of this information alone. Each piece of information respectively constitutes a job ID 641, a job name 642, a data storage location 643, and a print settings storage location 644. The notification information B is generated in the XML format shown in FIG. 7F based on FIG. 8D. Each piece of information respectively constitutes a job ID 561, a job name 562, a data storage location 563, and a print settings storage location 564. In the following description, the notification information B is recorded in the format of FIG. 8D. When generation of the notification information B is completed, the job information presentation unit 351 transmits the notification information B to the image forming apparatus 120.

Upon receiving the notification information B, the job information receiving unit 331 of the image forming apparatus 120 confirms the print data storage location and the print settings storage location recorded in the notification information B, and notifies the print data acquisition unit 332 and the print settings acquisition unit 333 of each piece of information. The print data acquisition unit 332 acquires the print data from the print data storage unit 352 based on the notified print data storage location. The print settings acquisition unit 333 acquires the print settings from the print settings storage unit 353 based on the notified print settings storage location.

When acquisition is completed, the control unit 322 issues an instruction for print job generation to the print job generation unit 334. The print job generation unit 334 respectively receives the print data from the print data acquisition unit 332 and the print settings from the print settings acquisition unit 333, and generates a print job according to the print settings. When print job generation is completed, the print job generation unit 334 transmits the print job to the print execution unit 335. The print execution unit 335 outputs the print job from the printing unit. The foregoing is the process flow in the case where the image forming apparatus 120 operates as a push print device.

Next, a description is given of the case where the image forming apparatus 120 operates as a pull print device. The image forming apparatus 120 ignores the notification information A issued by the job information presentation unit 351, and does not conduct processing even when it is received. When the user issues a pull print request from the image forming apparatus body, the image forming apparatus 120 acquires the print data, and continues with print processing. The processing is described below.

When a log-in request and a pull print request are conducted by the user with the operating unit 321, the operating unit 321 instructs the control unit 322 to carry out user authentication. Otherwise, the operating unit may be furnished with a card reader (not illustrated in the drawings), and the user information may be input merely by passing a card over it. Next, the control unit 322 checks the user information saved in the user information storage unit 325, and conducts user authentication. If authenticated as a user who may conduct use, the following processing continues. In Embodiment 1, user authentication processing may be omitted, because a single user is assumed. In such cases, the operating unit 321 may conduct only a pull print request.

The control unit 322 instructs the job information receiving unit 331 to issue a job information request to the print service 340. A job information request is conducted in the format shown in the aforementioned FIG. 7G1. The processing subsequent thereto is identical to push print. That is, the job information presentation unit 351 returns the notification information B in response to receipt of the job information request, and the job information receiving unit 331 acquires the print data and the print settings in response to receipt of the notification information B, and executes printing. The foregoing is the process flow for the case where the image forming apparatus 120 operates as a pull print device.

As described above, the difference between a push print device and a pull print device is that the former initiates printing in response to receipt of the notification information A, whereas the latter ignores the notification information A, and initiates printing in response to receipt of a pull print request. The push print device and the pull print device may be predetermined by image forming apparatus, or the mode of printing may use either print method by setting the operational mode of the image forming apparatus.

If the print service 340 only issues the notification information A at the time of push printing, and not at the time of pull printing, it is possible for the image forming apparatus 120 to switch operational modes according to whether or not the notification information A is received. With such a system, the image forming apparatus 120 does not need to be rendered as a push print dedicated device or a pull print dedicated device, and may accommodate both print methods.

Notification information A including the mode may be issued as shown in FIG. 7H2 or FIG. 7H3 according to whether the print service 340 is pull print or push print. With such a system, the image forming apparatus 120 may ultimately conduct operation in either mode by discriminating operation based on the mode information of the received notification information A.

An individual image forming apparatus may be of a type which accommodates both push printing and pull printing. For example, push printing may be conducted upon receipt of the notification information A, or pull printing may be conducted in the case where a log-in request and a pull print request are issued by a user. The image forming apparatus 120 is preferably configured so that it acquires only pull print jobs when jobs are acquired without receipt of the notification information A. Of course, the print service 340 is also capable of handling formats which output FIG. 7H2 and FIG. 7H3. The foregoing has been a description of functions classified under a print system that is the second system.

The description of the first half of Embodiment 1 is given above. In the second half which follows, the basic functions described in the first half are developed, and advanced functions for carrying out an anywhere printing function are described. With the basic functions described in the first half, a service printer and an actual image forming apparatus are linked one-to-one. This is the same whether for push printing or for pull printing. However, there are cases where, for example, a job that one wishes to print is temporarily placed on a server in an office environment, and where it is desirable to conduct print-out at an actual usage site such as a conference room or a satellite office. Or there are cases where a serviceman wishes to output materials for use at a customer location from the image forming apparatus of a neighboring convenience store. With the aforementioned basic functions, it is impossible to carry out such an anywhere printing function. It is shown in the following description that an anywhere printing function can be implemented by a supplemental AWP function that is a virtual SP, and by a function for job information acquisition from SP to AWP.

First of all, an outline of the anywhere printing function is clarified. Based on instructions from the user, a dedicated SP for anywhere printing (AWP: anywhere print) is generated on the print server. Image forming apparatuses that operate in conjunction with the AWP are also set up. By generation of the AWP, a virtual printer corresponding to the AWP is displayed, and is selectable at the time of printing from an application. When the user selects the AWP to conduct printing, a job is spooled for the AWP. When the user logs into a given image forming apparatus, and issues a pull print request, the print service 340 acquires not only the jobs that are spooled in the SP linked to the image forming apparatus, but also the job(s) spooled in the AWP, and conducts printing output from the image forming apparatus. The foregoing is an outline of the anywhere printing function.

First, using the flowchart of FIG. 10, a description is given of a process flow for adding the AWP 345 that is a virtual service image forming apparatus for anywhere printing, and selection of a target model.

The details of the print service 340 in FIG. 10 are divided into SP-1 (344a), SP-2 (344b), AWP (345), and other processing. These have also been separated into sequence drawings, because the SP and the AWP can be logically understood as independent image forming apparatuses. In this regard, the other processing of the print service 340 is represented as basic processing 340. When distinguishing an individual SP, it is denoted in the manner of SP 344a (SP for MFP-01), SP 344b (SP for MFP-02); and when generically referencing an SP, it is denoted in the manner of SP 344.

First, a description is given of the processing flow in which a user registers MFP-01 in the print service 340. The operating unit 321 of the image forming apparatus 120 issues an image forming apparatus registration request to the print service 340 from the printer registration transmission unit 324 via the print control unit 320 in response to a registration request from the UI illustrated in FIG. 4A (S801). Here, the registration request shown in FIG. 6D is transmitted to the printer registration receiving unit 341 from the printer registration transmission unit 324. The printer information management unit 343 receives an instruction from the control unit 342 in response to receipt of the registration request by the printer registration receiving unit 341, and generates an SP 344a as a first printer object (S802). When generation of the SP is successful, the SP 344a returns a response of success to the printer information management unit 343 (S803).

Upon receiving the return response, the printer information management unit 343 issues a unique SP ID to use the SP that was created. The issued SP ID is managed as shown in FIG. 23A in combination with the registration information of the image forming apparatus employed during SP creation. FIG. 23A is the printer DB described with FIG. 8B. Here, SP-1 is registered. The issued SPID is returned to the print control unit 320 through the print control unit 342 and the printer registration receiving unit 341 (S804). The returned SPID is represented in XML format as shown in FIG. 6E. The printer registration transmission unit 324 sends the received SPID to the control unit 322. The control unit 322 instructs the printer information storage unit 323 to manage the SPID by linking with the printer information. The printer information storage unit 323 stores the SPID in the table shown in FIG. 8A (S805).

S811 to S815 illustrate an example in which the same processing is conducted for an MFP-02 that is a different model. The processing is identical to that described from S801 to S805, except that an SP-2 (344b) that is a different SP is generated.

Next, a description is given of the processing whereby addition of AWP and selection of its target model are conducted in the management screen of the print service by a user. The web browser 380 logs into the print service 340 based on instructions from the user. When log-in is successful, the communication unit 354 displays FIG. 5C1 that is a management screen. As shown in FIG. 5C1, the management screen displays a printer list 431, an AWP addition button 432, an AWP target update button 433, and an AWP cancellation button 434. The printer list 431 displays a list of the image forming apparatuses that can be used by the user who has logged in. Generally, image forming apparatuses are displayed that have been added by the aforementioned procedure of S801 to S815. The AWP addition button 432 is a button that serves to add an AWP that is a dedicated SP for conducting an anywhere printing function. When the AWP is added, a printer selection item is displayed that shows a second printer object. The AWP target update button 433 is a button for updating AWP target models. It is invalid until an AWP function becomes effective. The AWP cancellation button 434 is a button for cancellation of an AWP function. It is invalid until an AWP function becomes effective.

When the AWP addition button 432 is pressed, the communication unit 354 instructs the control unit 342 to add an AWP function (S821). The control unit 342 instructs the printer information management unit 343 to generate an AWP, and the printer information management unit 343 generates the AWP 345 (S822). The AWP 345 is an anywhere printing-dedicated SP that is not directly linked to any single actual image forming apparatus, and that otherwise has the same functions as an ordinary SP. With respect to information related to the image forming apparatuses such as printer name, capabilities, and initial print setting values, whatever is internally stored for AWP use may be employed, and inputs may be received from the outside.

When AWP generation is successful, the AWP 345 returns a response of success to the printer information management unit 343 (S823). The printer information management unit 343 issues an SPID when the response of success is received, and an AWP is added to the registration information shown in FIG. 23A. According to FIG. 23A, the SPID generated by the printer information management unit 343 is a SP-AW. The printer management screen displayed by the communication unit 354 is updated as in FIG. 5C2, and an Anywhere Print 435 is displayed in the printer list 431. Any of the image forming apparatuses of the printer list 431 may be selected. In addition, the AWP addition button is invalidated, and the AWP target update button 433 and the AWP cancellation button 434 are validated.

Next, when the AWP target update button 433 shown in FIG. 5C2 is pressed, the processing advances so that the image forming apparatus selected in the printer list 431 becomes the AWP target model (S824). In addition, the communication unit 354 instructs the control unit 342 to update the printer information. The control unit 342 issues an instruction to the printer information management unit 343, and the information of the AWP target model 627 of FIG. 23A is updated according to the selection/non-selection of each model. That is, the printer information management unit 343 functions as management means that creates a first or second printer object upon receipt of a registration request from an image forming apparatus or a user device, and manages the registration information of the created printer object. Now, ON is set in the case of an AWP target model, and OFF is set in the case of a non-target model. In the present embodiment, a user can select a target image forming apparatus using the management screen shown in FIG. 5C2, but a configuration may be adopted wherein it is predetermined that all registered image forming apparatuses are AWP targets. In such a case, the management table of FIG. 23A is set so that all models are targeted. Although the details are described below, when pull printing is conducted from an image forming apparatus that is a target model, it is possible to also output other jobs that are spooled in AWP from that image forming apparatus. By the foregoing processing, it is possible to conduct AWP addition and target model selection.

Figure 11:
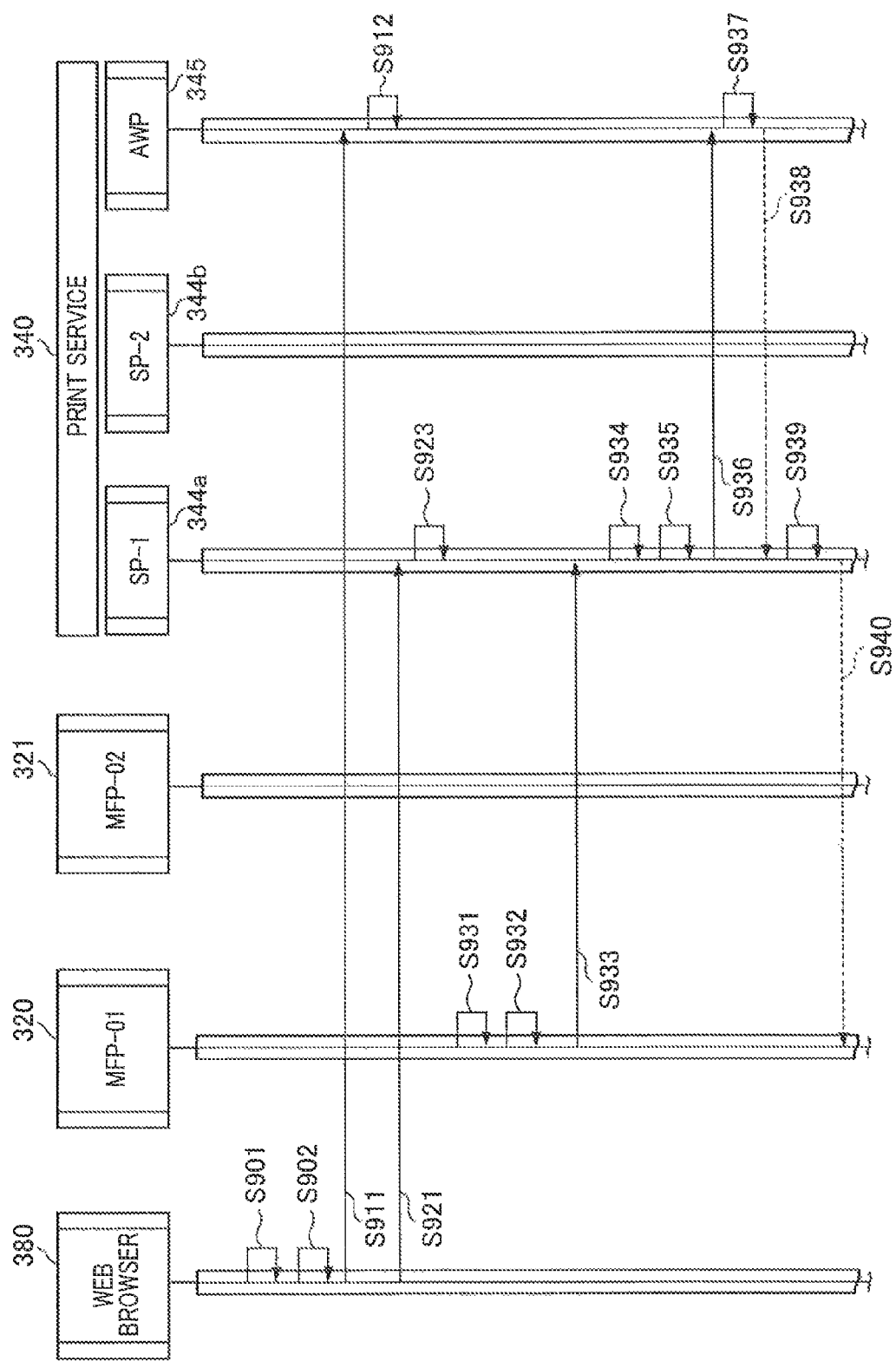
FIG. 11 illustrates processing from print instruction to output of print job in Embodiment 1.
Figure 12:
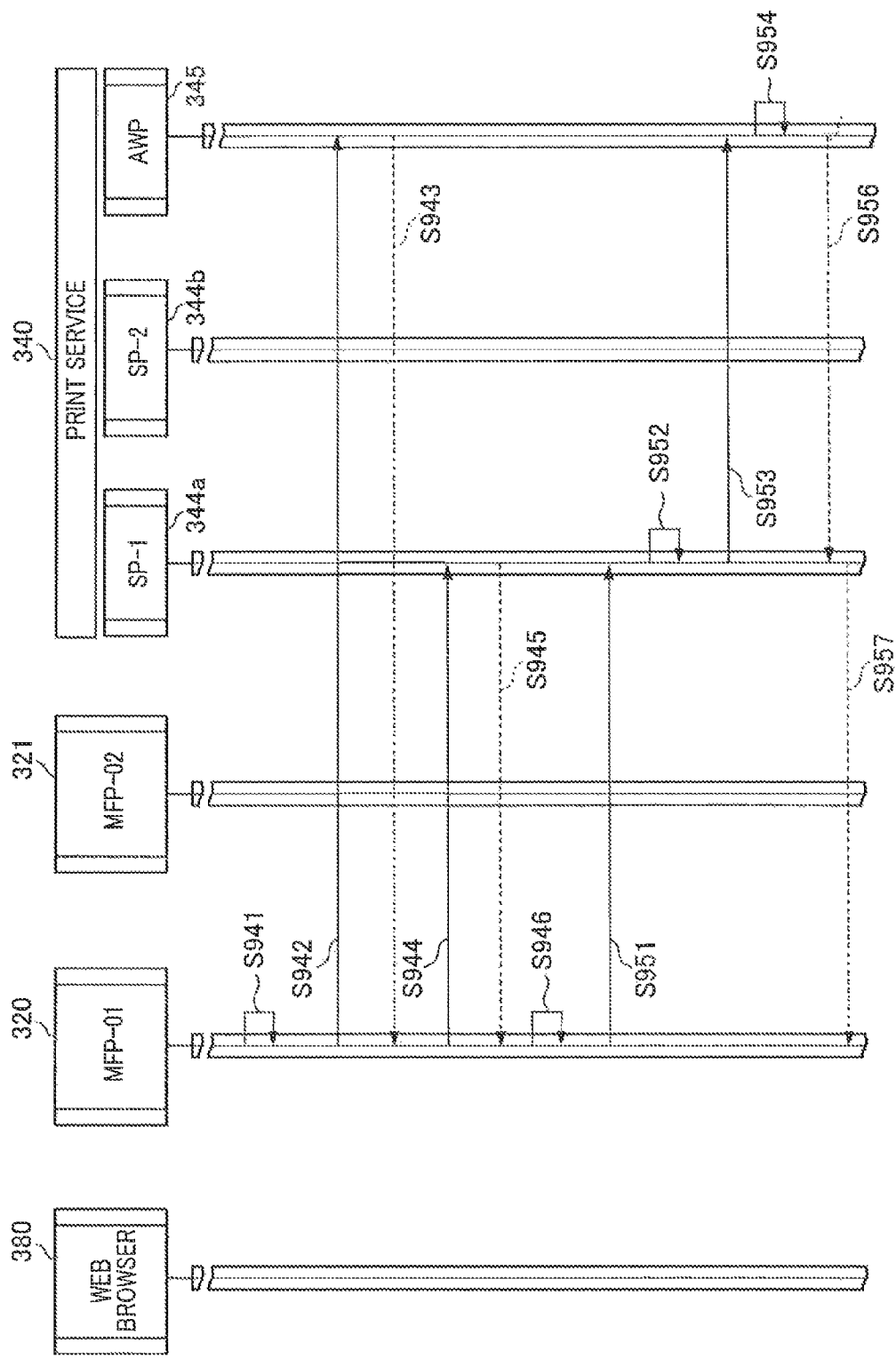
FIG. 12 illustrates processing from print instruction to output of print job in Embodiment 1.
Figure 13:
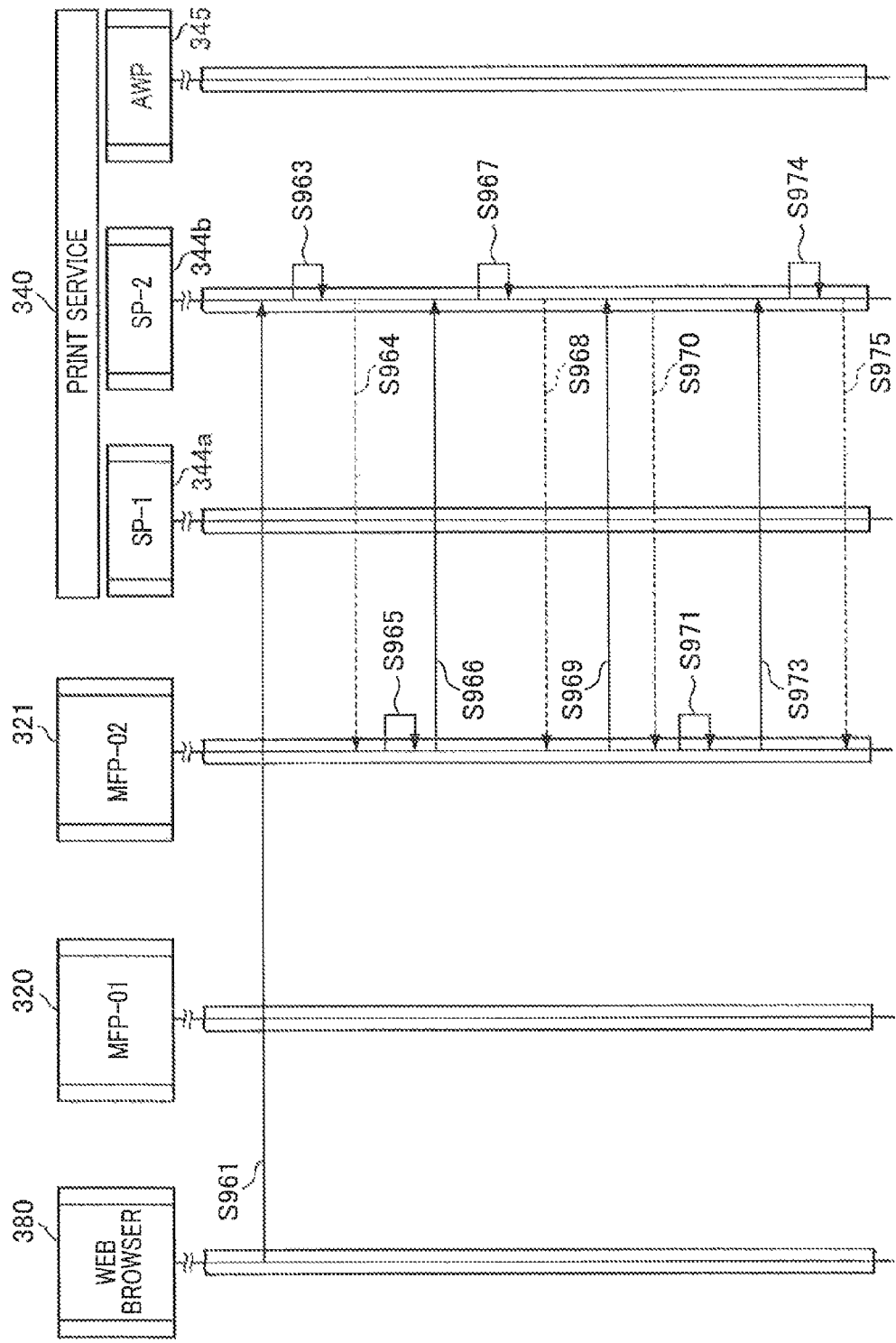
FIG. 13 illustrates processing from print instruction to output of print job in Embodiment 1.

Next, using the flowcharts of FIG. 11 to FIG. 13, a description is given of the respective processing steps of anywhere printing, push printing, and pull printing in this print system. The details of the print service 340 are divided into SP-1 (344a), SP-2 (344b), and AWP (345) shown in the drawings. As described with respect to FIG. 10, as an SP or an AWP can be logically understood as an independent image forming apparatus, direct reception of requests or direct transmission of instructions are performed to each SP or AWP in sequence drawings. However, as regards the implementation method, the SP or the AWP is part of the information, and other modules may conduct the processing according to the information.

Here, It is assumed that the process flow whereby the user opens the web application 360 from the web browser 380, creates content, and executes printing. First, the web browser 380 activates the web application 360, and receives the input of content creation. When a print instruction is issued by user operation, the web browser 380 receives a printer list and a UI screen for establishing print settings from the printer information presentation unit 346. The printer list is created based on the printer management table of FIG. 23A, and the UI shown in FIG. 4B2 is displayed (S901).

As shown in FIG. 4B2, there is display of the three items of an MFP-01 (426) and an MFP-02 (427) as first printer objects, and of an Anywhere Print 425 that does not specify an image forming apparatus as a second printer object. That is, the printer information presentation unit 346 functions as display means for displaying a selection screen of image forming apparatuses including printer selection items showing first printer objects having a correspondence relationship with image forming apparatuses, and a second printer object that does not have a correspondence relationship. When MFP-01 or MFP-02 is selected, it is possible to select ordinary printing (Push Print) and temporarily stored printing (Pull Print) as a mode selection 428. The web browser 380 receives selection of any of the image forming apparatuses (S902).

Now, in the case where the Anywhere Print 425 is selected, i.e., in the case where an instruction for anywhere printing is issued, the print instruction is transmitted to the AWP 345 (S911). Upon receiving the print request, the AWP 345 acquires the print data from the web application 360 via the job information acquisition unit 348. The AWP 345 also acquires the print settings that were established in the settings screen shown in FIG. 4B2. In the case where the Anywhere Print 425 is selected, the print settings may retain the initial print setting values. The AWP 345 instructs the job information management unit 349 to link the print data and the print settings, and store a Job_001 as job information as shown in FIG. 23B (S912). That is, the job information management unit 349 functions as a storage means for storing the job information. FIG. 23B is the job management DB described with respect to FIG. 8C. The AWP 345 sets "AWP" under the mode 639 of the job information.

A description is now given of the mode 639. When a print instruction is issued for AWP, the job spooled therein becomes the AWP job, and the AWP 345 sets "AWP" as a third mode in the job information of the job information management unit 349. When a print instruction is issued to an SP in the temporarily stored printing (Pull Print) mode, the job spooled therein becomes a pull job, and 344a or 344b sets "Pull" as a second mode in the job information of the job information management unit 349. Printing of the AWP job and the pull job is triggered by a pull print request, i.e., a print request from the image forming apparatus 120. When a print instruction is issued to an SP in the normal printing (Push Print) mode, the job spooled therein becomes a push job, and 344a or 344b sets "Push" as a first mode in the job information of the job information management unit 349. Printing of the push job is triggered by the notification information A from the print service.

Next, in FIG. 4B2, the MFP-01 426 is selected, temporarily stored printing (Pull Print) is selected in the mode selection 428, and a print instruction is transmitted to the SP 344a when a print instruction is issued (S921). Upon receiving a print request, the SP 344a obtains the print data from the web application 360 via the job information acquisition unit 348. It also acquires the print settings that were established in FIG. 4B2. The SP 344a instructs the job information management unit 349 to link print data and the print settings, and store the job information in the manner of Job_002 of FIG. 23B (S923). At this time, the mode 639 is "Pull".

Next, a description will be given of a process flow wherein a pull print request is received from a specific image forming apparatus in a state where one or more pull jobs are spooled in the print service 340. Upon receiving user authentication, the operating unit 321 of the image forming apparatus 120 instructs a pull print to the control unit 322 (S931). In the case where there is only one user who is employing the image forming apparatus, it is sufficient if there is simply an input unit (not illustrated in the drawings) that receives pull print requests without conduct of user authentication. Upon receiving a pull print request, the control unit 322 first issues an instruction to the printer information storage unit 323, and acquires the values of the SPID 615 of FIG. 8A (S932).

Next, the control unit 322 instructs the job information receiving unit 331 to acquire the job information in Pull mode from the acquired SPID. The job information receiving unit 331 creates an acquisition request for the job information illustrated in FIG. 7G2 that was set by the second mode, and transmits the request to the job information presentation unit 351 of the print service 340 (S933). With the job information request illustrated in FIG. 7G2, in addition to the SPID, it is shown as an argument that there is a Pull mode.

Upon receiving a job information request, the job information presentation unit 351 delivers it to the printer information management unit 343 via the control unit 342. The printer information management unit 343 passes job information request to the SP 344a since the argument is the Pull mode. Upon receiving the job information request, the SP 344a instructs the job information management unit 349 and acquires the pull job(s) spooled in SP-1 (S934). Specifically, jobs are extracted for which "Pull" is set under the mode 639 shown in FIG. 23B. Here, the SP 344a acquires JOB_002 as the job.

Next, the SP 344a confirms whether the user who is currently logged in is generating an AWP (S935). This can be discriminated by whether or not an SP-AW exists in the SPID 621 of the printer information management unit 343 of FIG. 23A. In the case where an SP-AW exists, it is further confirmed whether the SP itself (SP-1 in this case) corresponds to the AWP target model 627. In the case where it does so correspond, the SP 344a issues a job information request to the AWP 345 (S936). If it does not so correspond, the processing from S936 to S939 is skipped.

Upon receiving the job information request, the AWP 345 creates the job information (S937). Specifically, the AWP 345 instructs the job information management unit 349 to extract the job(s) for which "AWP" is set under the mode 639 shown in FIG. 23B. Here, the AWP 345 acquires JOB_001. The AWP 345 returns the job information to the SP 344a (S938). Upon receiving the job information from the AWP 345, the SP 344a merges it with the job information acquired in S934 (S939). The information merged here is shown in FIG. 23C. In the case where the user conducts user authentication (issues a pull print request) with MFP-02, as the jobs spooled in SP-2 and AWP are merged, thus there is only a Job_001 as shown in FIG. 23D. The job information generated with SP 344a is returned to the image forming apparatus 120 (S940). By this processing, the user can execute anywhere printing when temporarily stored printing is executed, alleviating labor for the user.

The image forming apparatus 120 that receives the job information may display the UI of FIG. 9A that enables job selection in the operating unit 321. In that case, only a selected job is treated as an object of printing (S941 of FIG. 12). As there are also compact image forming apparatuses that do not have a display panel, all acquired jobs may be treated as objects of printing without display. In the example shown in FIG. 9A, job selection is possible from a job list 711, and printing is executed by pressing a print button 712. Printing can also be canceled by pressing a cancel button 713.

When the jobs to be printed are finalized, the control unit 322 acquires the respective information of each job such as the data storage location 643 and the print settings storage location 644 based on the job information shown in FIG. 23C. The print data acquisition unit 332 acquires the print data, and the print settings acquisition unit 333 acquires the print settings from the respectively designated locations. In this example, Job_001 has been spooled in SP-AW, and Job_002 has been spooled in SP-1, and the print data acquisition unit 332 acquires each spooled job (S942-S945).

The print job generation unit 334 receives the print data and the print settings that were acquired by the print data acquisition unit 332 and the print settings acquisition unit 333, renders them to generate the print job, and instructs the print execution unit 335 to execute output (S946). When output is completed, the image forming apparatus 120 sends the job status to the SP 344a (S951). Here, the control unit 322 sends a notification of completion of Job_001 and Job_002 as an execution status via the job information receiving unit 331. The SP 344a checks the status of its job (here, Job_002) that is spooled in SP-1, and issues an instruction to the job information management unit 349 to update the job status 638 shown in FIG. 23B (S952). In the case where printing is successful, DONE is set in the status (not illustrated in the drawing).

The SP 344a transmits the job status for the job other than its own job to the AWP 345 (S953). The job other than its own job is the job acquired by the AWP. The AWP 345 checks the status of its own job (here, Job_001) that is spooled in AWP, and issues an instruction to the job information management unit 349 to update the job status 638 shown in FIG. 23B (S954). The AWP 345 sends a notification of update success to the SP 344a (S956). The SP 344a sends the successfully updated information to the image forming apparatus 120 (S957).

Next, a description is given of the process flow in the case where push printing is designated. In FIG. 4B2, MFP-02 (427) is selected by user operation, normal printing (Push Print) is selected by mode selection, and a print instruction is transmitted to the SP 344b when an instruction for printing is issued (S961).

Upon receiving the print instruction, the SP 344b acquires the print data from the web application 360 via the job information acquisition unit 348. It also acquires the print settings that were made in FIG. 4B2. The SP 344b instructs the job information management unit 349 to link the print data and the print settings, and store Job_003 as the job information shown in FIG. 23B (S963). At this time, the mode 639 is "Push".

The SP 344b transmits the notification information A to an image forming apparatus 321 (S964). That is, the print service 340 functions as a transmission means, transmitting a job in response to receipt of a request from an image forming apparatus when anywhere printing is selected, and transmitting notification information when push printing is selected. Upon receipt of the notification information A, an image forming apparatus 321 acquires the saved SPID of FIG. 8A (S965), and requests the print server 340 to acquire the job information by push mode from the pertinent SPID. Here, a request for the job information illustrated in FIG. 7G3 that was set by the first mode is prepared, and is transmitted to the print server 340 (S966). As an argument, in addition to the SPID, the job information request illustrated in FIG. 7G3 indicates that there is push mode (first mode). As shown in FIG. 7G1, the print service 340 may also discriminate that there is push mode when push mode is not specified.

Upon receipt of the job information request, the SP 344b instructs the job information management unit 349 to acquire the push job saved in SP-2 (S967). Specifically, the job for which "Push" is set under the mode 639 of the job information shown in FIG. 23B is extracted. Here, JOB_003 in FIG. 23E is acquired.

The job information generated by the SP 344b is returned to the image forming apparatus 321 (S968). The image forming apparatus 321 acquires the print data and the print settings from the received job information (S969, S970), and generates and outputs a print job (S971). The image forming apparatus 321 transmits the job status to the SP 344b (S973). The SP 344b updates the status of its job that is managed by the job information management unit 349 (S974), and returns a notification of update success to the image forming apparatus 321 (S975).

Note that the respective SPs do not issue the notification information A when an instruction is issued for anywhere printing or temporarily stored printing. Consequently, as described with respect to the basic functions, the image forming apparatus 120 respectively operates as a push print device if it receives the notification information A, and as a pull print device if it does not receive the notification information A, and receives a pull print request.

As another embodiment, the SP may respectively issue the notification information A shown in FIG. 7H2 in the case where an instruction is issued for anywhere printing or temporarily stored printing, and the notification information A shown in FIG. 7(H3) in the case where an instruction for normal printing is issued. In such cases, the image forming apparatus 120 respectively operates as a pull print device if it receives the notification information A of FIG. 7H2, and as a push print device if it receives the notification information A of FIG. 7H3.

According to the foregoing processing, it is possible for a user to issue an anywhere printing instruction by adding an image forming apparatus AWP for anywhere printing. By allowing the SP to collect information from the AWP, information acquisition for anywhere printing becomes possible. By means of the foregoing, it is possible to carry out an anywhere printing function in a cloud print system. It also becomes possible to combine push printing, pull printing, and anywhere printing, and construct an environment with a high degree of freedom.

(Embodiment 2)

In Embodiment 1, processing is shown for the case where there is always a one-to-one linkage between an actual image forming apparatus and a print service SP. As an image forming apparatus could only communicate with a specific SP, it is necessary to conduct complex processing in order to acquire a job that is handled by the AWP. A description is now given of a method wherein a push job is directly acquired from a corresponding SP, and a pull job is directly acquired from the AWP.

Figure 14:
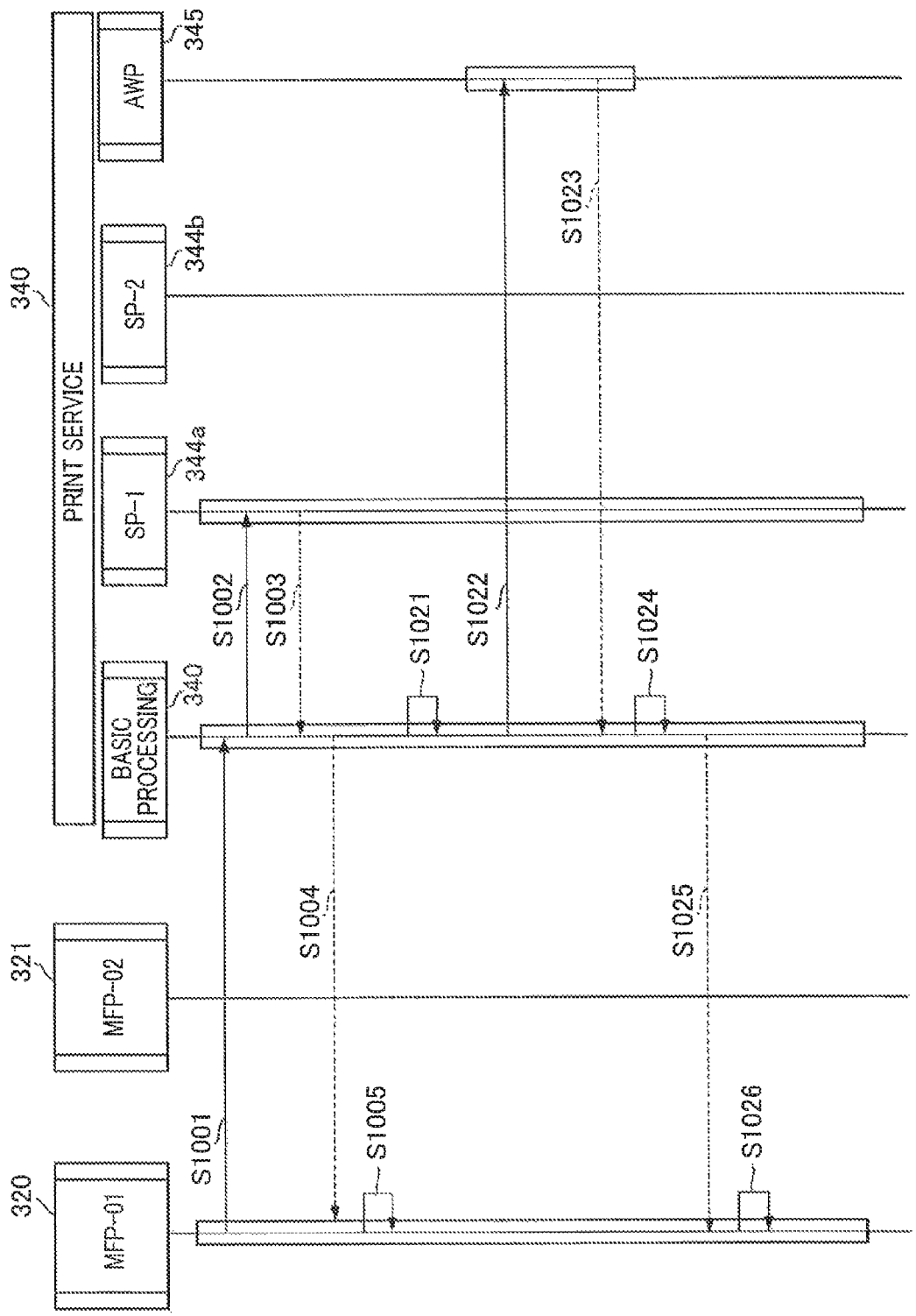
FIG. 14 illustrates processing which registers an image forming apparatus in a print service in Embodiment 2.

First, using the flowchart of FIG. 14, a description is given of a registration processing flow of an image forming apparatus in the present embodiment. In S1001, a request for registration of the image forming apparatus 120 is made to the printer registration receiving unit 341 of the print service 340 from the printer registration transmission unit 324 of the image forming apparatus 120. In S1002, the printer information management unit 343 of the print service 340 generates the SP 344a. In S1004, the printer registration receiving unit 341 of the print service 340 transmits the SPID to the image forming apparatus 120. In S1005, the printer information storage unit 323 of the image forming apparatus 120 stores the acquired SPID as the SPID 615 shown in FIG. 8A that constitutes a push print SPID, i.e., a first identification information. Similarly, when the printer information management unit 343 generates the SP 344b, a push print SPID is issued, and transmitted to the image forming apparatus, and the printer information storage unit 323 of the image forming apparatus 120 stores the acquired SPID under the SPID 615 as a first identification information (not illustrated in the drawings).

Next, when the communication unit 354 receives an AWP addition instruction from a user in S1021, the printer information management unit 343 generates the AWP 345 in S1022. When the AWP 345 is generated, the AWP 345 returns a response of success to the printer information management unit 343, and the printer information management unit 343 that receives the response of success generates an SPID in S1023. When the communication unit 354 receives an AWP target update instruction from a user, the control unit 342 acquires the information of the image forming apparatuses from the AWP-target SP in S1024. The control unit 342 transmits the APW SPID (SP-AW) to all AWP-target image forming apparatuses via the printer registration receiving unit 341 in S1025. The respective image forming apparatuses 320, 321 store the received SPID as the pull SPID 616 shown in FIG. 8A that constitutes a pull print SPID, i.e., second identification information. The foregoing has been a description of the registration processing flow of image forming apparatuses in the present embodiment.

Figure 15:
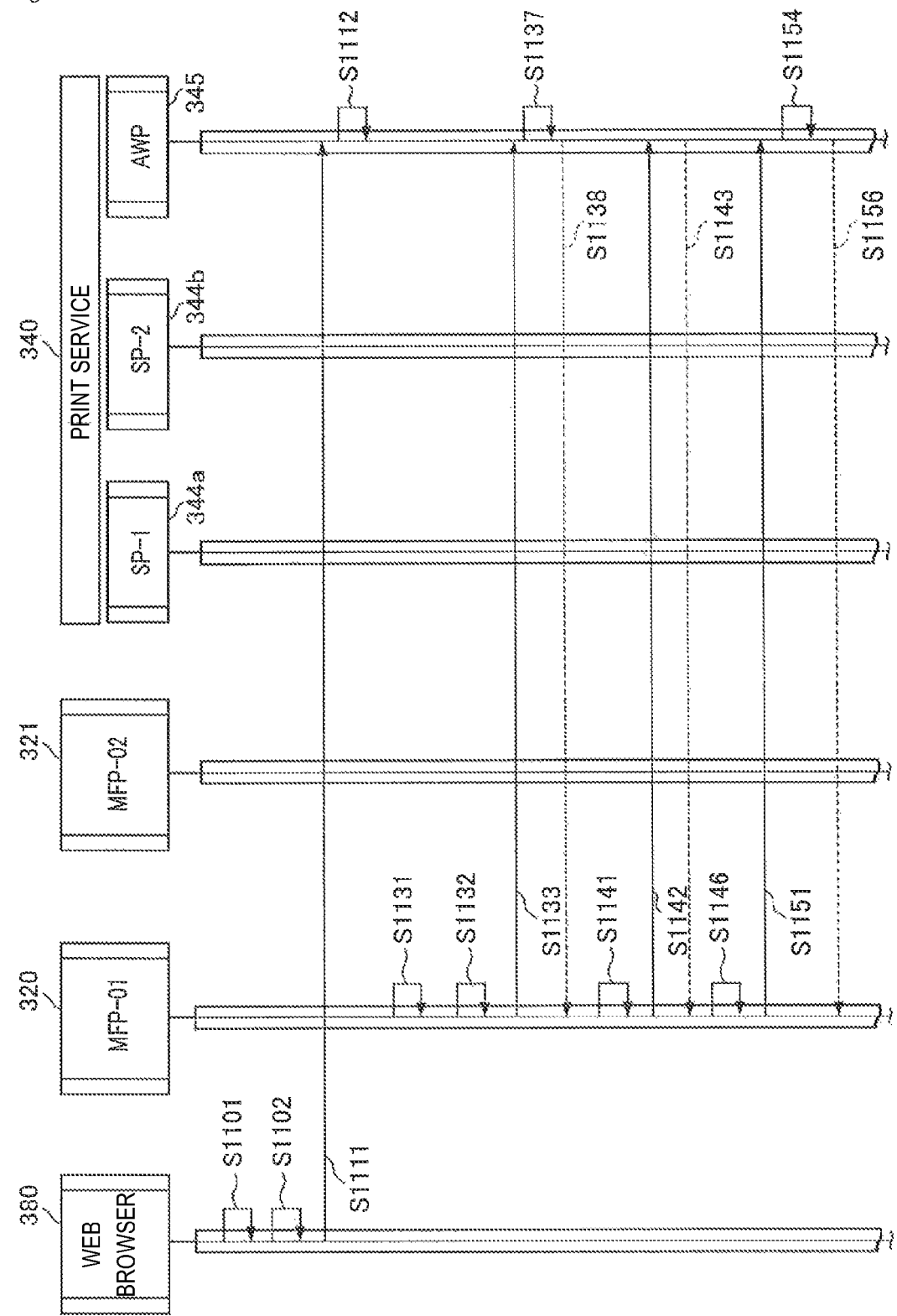
FIG. 15 illustrates processing from print instruction to output of print job in Embodiment 2.

Next, using the flowchart of FIG. 15, a description is given of the printing flow in the present embodiment. In the present embodiment a system is shown in which anywhere printing and push printing can be combined. First, the processing from S1101 to S1112, i.e., the processing in which a job is spooled in the anywhere printing mode is identical to the processing from S901 to S912 described in Embodiment 1. Here, Job_001 is spooled as shown in FIG. 23F. Note that, in the present embodiment, the user conducts image forming apparatus selection and establishes print settings using a UI shown in FIG. 4B3. The difference between FIG. 4B2 and FIG. 4B3 is that there is no print mode 428 in FIG. 4B3 at the time of SP selection. In short, the AWP mode occurs when the Anywhere Print 425 is selected, and the push mode occurs when a specific model is chosen.

In S1131, when user authentication is conducted in the operating unit 321 of the image forming apparatus 120, the control unit 322 discriminates that a pull print request has been issued. In S1132, when the pull print mode is operative, the printer information storage unit 323 acquires the pull-use SPID 616 of FIG. 8A. In S1133, the job information receiving unit 331 issues a request for job information to the print service 340 using the acquired pull-use SPID (second identification information). This directly accesses the AWP 345, and is a request for acquiring the job information spooled in the AWP. In short, the difference with Embodiment 1 is that there is no interposition of the SP 344a. In S1137, the AWP 345 issues an instruction to the job information management unit 349, and acquires the job information spooled in the AWP as shown in FIG. 23F. Here, Job_001 in FIG. 23G is acquired. In S1138, the AWP 345 returns the job information to the image forming apparatus 120. The processing from S1141 to S1146, i.e., the processing whereby a print job is selected on a panel, and the finalized job is downloaded, and printed is identical to the processing of S941 to S946 described in Embodiment 1.

Next, in S1151, the image forming apparatus 120 directly transmits the job status to the AWP 345 using the pull-use SPID 616 acquired in S1132. In S1154, the AWP 345 issues an instruction to the job information management unit 349 to update the job status, the job status 638 of FIG. 23F is updated to DONE, and, in S1156, a notification of update success is returned to the image forming apparatus 120.

Figure 16:
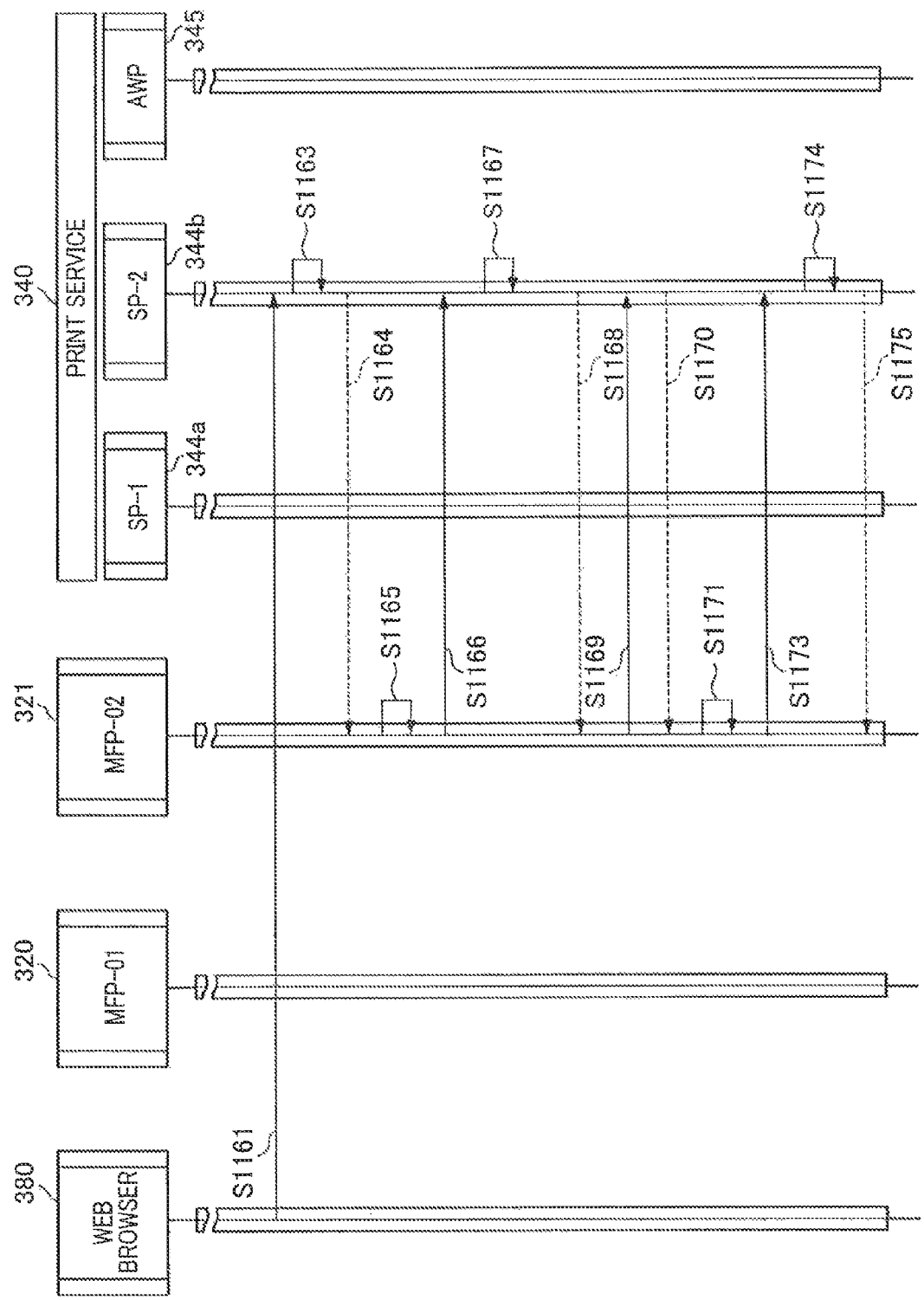
FIG. 16 illustrates processing which registers an image forming apparatus in a print service in Embodiments 3 and 4.

Next, a description is given of push printing with reference to FIG. 16. Here, printing to MFP-02 is conducted. In S1161, in printing from the application, a push mode is applied as stated above when the MFP-02 427 is selected, and printing is executed with the UI of FIG. 4B3. In S1163, a job is spooled in the SP 344b, and is stored as the Job_002 of FIG. 23F. In S1164, the SP 344b transmits the notification information A to the image forming apparatus 321. In S1165, the image forming apparatus 321 discriminates that there is push mode upon receipt of the notification information A, and the printer information storage unit 323 acquires the SPID 615 for push print use (the second identification information) of FIG. 8A. The processing from S166 to S1175, i.e., the processing in which a job is acquired and printed from an acquired SPID, and status is updated is identical to the processing of S966 to S975 described in Embodiment 1. Here, Job_002 is acquired as in FIG. 23H. The foregoing has been a description of the print processing flow of the present embodiment.

In the present embodiment, a description has been given of the case where a user selects the AWP mode or the push mode using the print setting UI of FIG. 4B3, but it is also acceptable to have three selections by adding a pull mode using the print setting UI of FIG. 4B2. In this case, in addition to acquisition of an AWP job with the pull-use SPID acquired in S1132 in response to the pull print request of S1131, a push-use SPID may be acquired in the same manner as S1165, and a pull job may be acquired from the pertinent SP.

According to the foregoing processing, an image forming apparatus uses a pull-use SPID and a push-use SPID for different purposes, thereby enabling the jobs spooled by each SP or AWP to be directly acquired from a print service, and enabling avoidance of redundant passes. When there is much non-synchronous processing and long paths with an Internet connection, there is a substantial negative impact on performance. Consequently, print processing can be conducted more quickly by direct acquisition.

(Embodiment 3)

In Embodiments 1 and 2, the description concerned a system in which a single user is assumed. However, in actual office environments, it is common to have situations where multiple users share a single image forming apparatus. However, in the case where a print service session with an image forming apparatus is established by a manager's account, and where other users share the SP, it is not possible to sort the AWP job of a specific user to conduct pull printing. This is because in the case where each user conducts printing with respect to a shared SP, spooling is conducted to the spooler of the manager, and there is no mechanism in this instance for extracting only a job linked to user information.

In the present embodiment, even in pull printing from an image forming apparatus connected to a manager's account, it is possible to acquire a job of any user by imparting user information at the time of the pull print request.

When executing anywhere printing with the job management screen of a print service, it is not known which image forming apparatus finally conducts output. In the present embodiment, it is possible to confirm the final output target with a job management screen by using the image forming apparatus name of the output SP.

Figure 17:
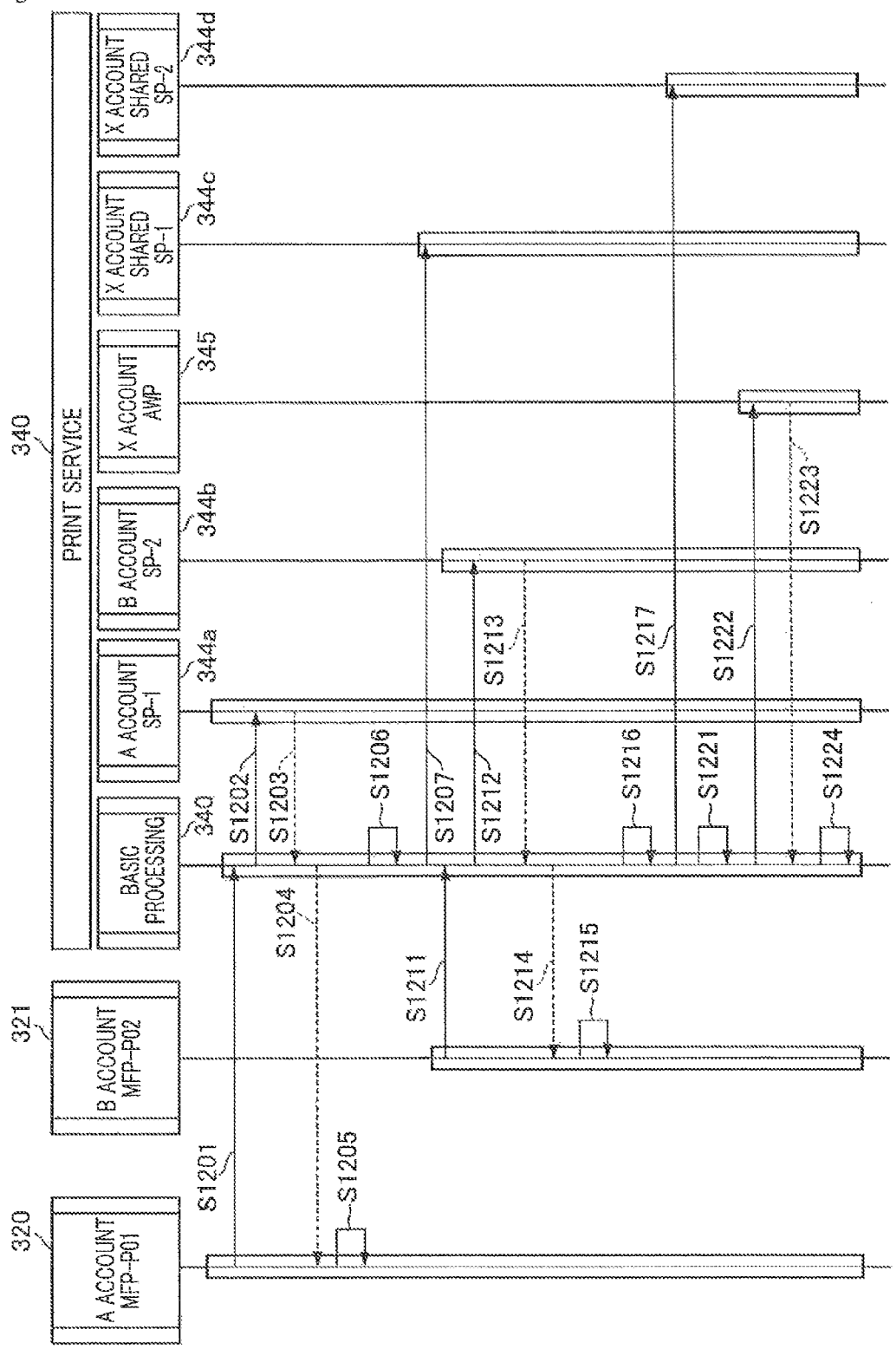
FIG. 17 illustrates processing which registers an image forming apparatus in a print service in Embodiments 3 and 4.

First, a description is given of the registration processing flow of image forming apparatuses in the present embodiment using the flowcharts of FIG. 16 and FIG. 17. First, a description is given of the processing whereby a manager Admin A registers MFP-01 in a print service with his/her own account.

The processing from S1201 to S1205—i.e., the processing for issuance of a registration request from an image forming apparatus to a print service, and for storage of the returned SPID—is identical to the processing of S801 to 5805 described in Embodiment 1. However, the account of Admin A is used for connection, and subsequently the session connection continues with the account of Admin A. As with SP-01 of FIG. 24A, the printer owner 623 is stored with the status of Admin A. In this state, users other than Admin A cannot conduct output from MFP-01.

In S1206, when the communication unit 354 receives an instruction for shared registration of the image forming apparatus 120 by User X and User Y from the manager Admin A, the printer information management unit 343 updates the shared information in the manner of the sharing destination 628 of FIG. 24A. In S1207, the printer information management unit 343 generates an SP 344c capable of being used by User X as a third printer object. The SP 344c may have actual existence, or it may be a virtual SP that is programmatically processed. FIG. 24B is a printer management table constructed for User X based on the image forming apparatus DB of FIG. 24A. As SP-1 can be used for User X, the printer owner 623 is represented as User X. When the sharing source 629 is Admin A, and when printing is executed, the job is spooled in SP-1 of Admin A. In the case where a certain SP is shared with another user, the sharing destination 628 shown in FIG. 23A managed by the printer information management unit 343 is set as above. In the case where another user causes sharing of a certain SP, the sharing source 629 is set in the printer management table for User X shown in FIG. 23B managed by the printer information management unit 343.

Subsequently, in S1211 to S1217, a manager Admin B conducts similar processing with respect to MFP-02. SP-2 is respectively added to the management tables shown in FIG. 24A and FIG. 24B.

Next, a description is given of the processing whereby User X logs into the print service 340, and adds the AWP in the screen shown in FIG. 4C1. As shown in FIG. 5C1, the shared image forming apparatus is also listed as a printer object. The processing from S1221 to S1223—i.e., the processing whereby an AWP addition instruction is received, and an AWP is generated—is identical to the processing of S921 to S923 described in Embodiment 1. However, the printer information management unit 343 creates the AWP 345 as a fourth printer object that is a second printer object for an individual user. By this means, an AWP is generated for which User X is the owner. SP-AW is respectively added to the printer management tables shown in FIG. 24A and FIG. 24B.

Next, in S1224, when the communication unit 354 receives a target updating request, a target is selected and set from the image forming apparatuses available shown in FIG. 24B. Information is stored in the manner of the AWP target model 627 of FIG. 24B. In S1221, a description is given of the case where the user voluntarily opens the management screen, but it is also acceptable to display the screen shown in FIG. 9B to bring about target updating when sharing is conducted in S1207 or S1217. Here, when the "Conduct approval and AWP target updating" 721 button is pressed, the screen shown in FIG. 5C2 is displayed. The foregoing has been a description of the registration processing flow of image forming apparatuses in the present embodiment.

Figure 18:
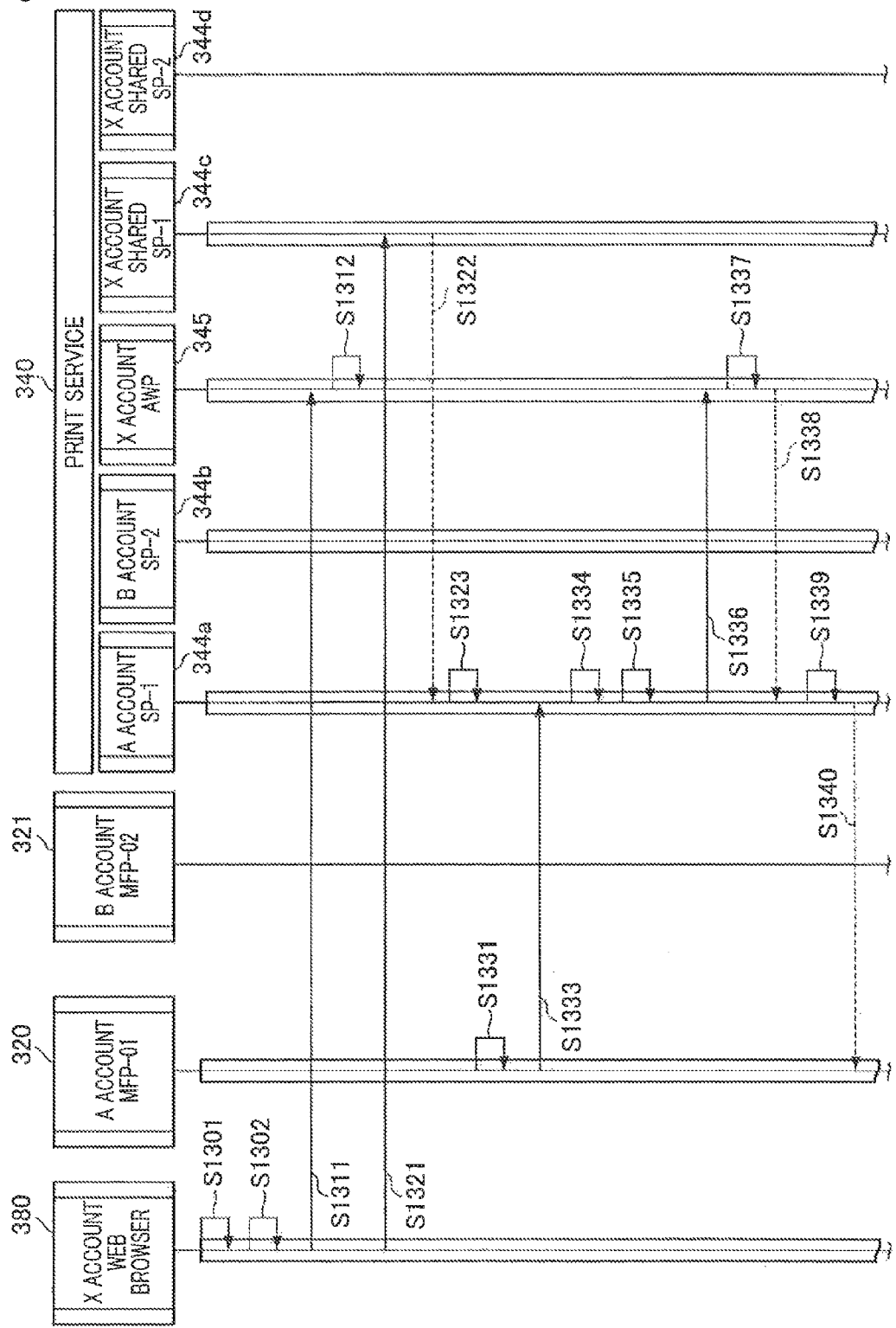
FIG. 18 illustrates processing from print instruction to output of print job in Embodiment 3.
Figure 19:
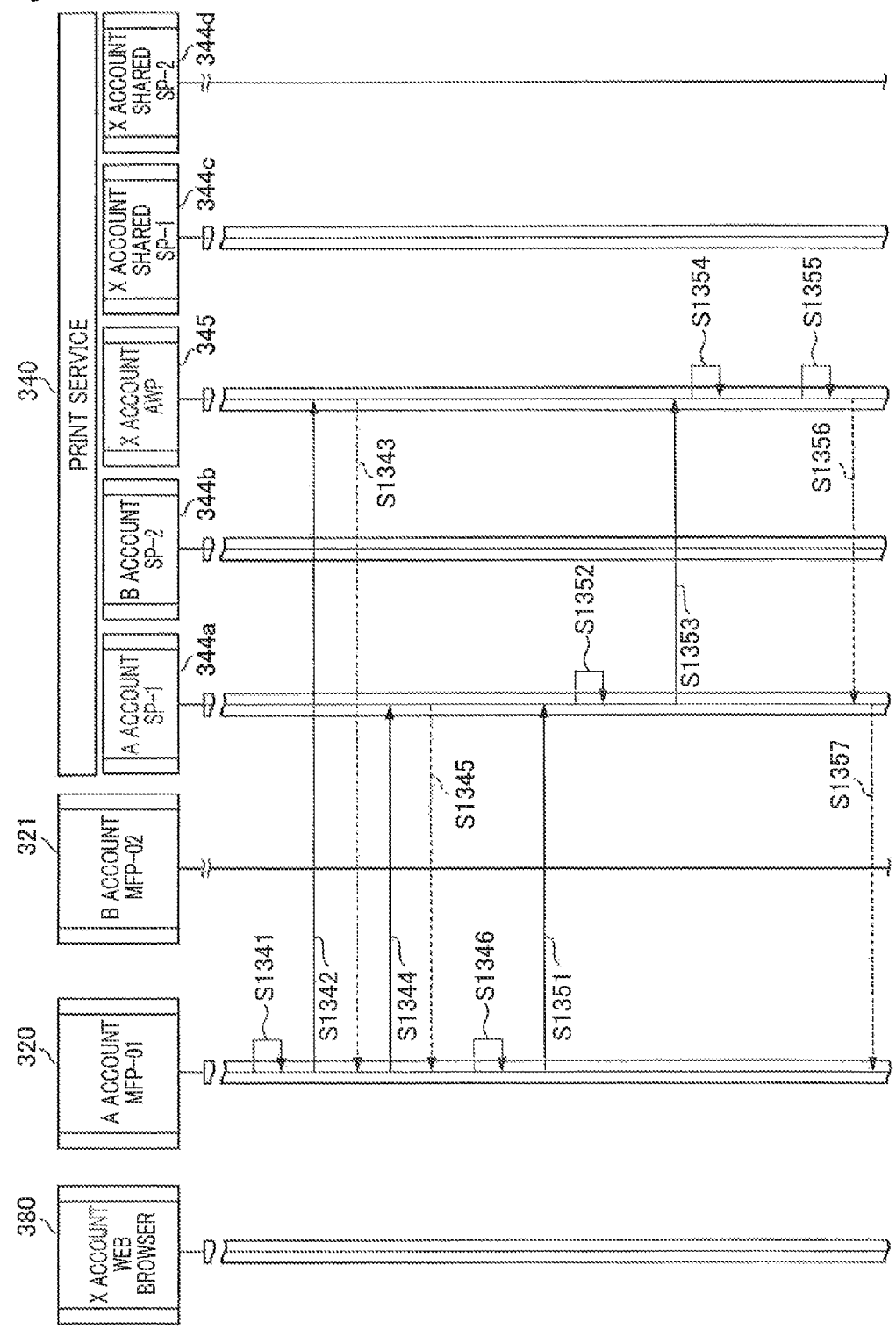
FIG. 19 illustrates processing from print instruction to output of print job in Embodiment 3.
Figure 20:
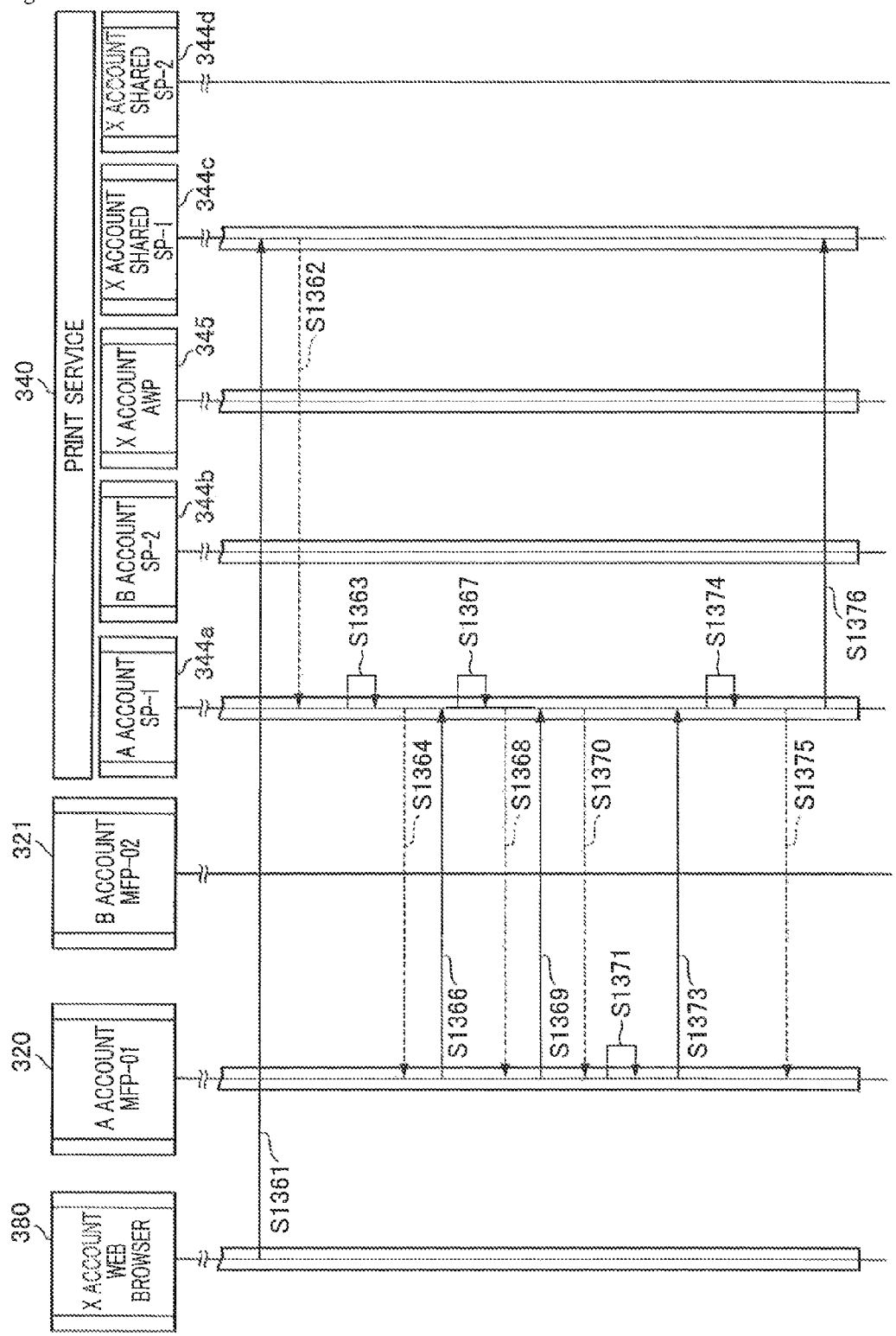
FIG. 20 illustrates processing from print instruction to output of print job in Embodiment 3.

Next, using the flowcharts of FIG. 18 to FIG. 20, a description is given of the print process flow in the present embodiment. In the present embodiment, a method is described wherein only the jobs of specific users are accurately sorted and output in an environment in which multiple users coexist with different user accounts.

First, the processing from S1301 to S1312, i.e., the processing in which a job is spooled in the anywhere printing mode, is identical to the processing from S901 to S912. Here, Job_001 of FIG. 24C is spooled. Job_004 is a job that is spooled in the same environment by User Y.

Next, in S1321, a print instruction is sent from the web browser 380 to the SP 344c in the case where the shared MFP-01 is selected, and where an instruction for temporarily stored printing is issued. As SP 344c is a shared SP, this print instruction information is sent to the SP 344a that is the sharing source in S1322. In S1323, the job is spooled. At this time, the SP 344a registers the mode of the job information managed by the job information management unit 349 as pull mode. As a result of this processing, the job information management unit 349 conducts storage as Job_002 as shown in FIG. 24C. The job information management unit 349 stores Pull under the mode 639. Job_005 is a job that is spooled by User Y in the same environment.

In S1331, a user conducts user authentication in the operating unit 321 of the image forming apparatus 120. Here, the user information storage unit 325 checks whether the log-in user is covered from the user information list managed in FIG. 8E, and allows printing upon confirmation. As shown in FIG. 8E, an example is used wherein a distinction is made between a local user name 651 and password 652 applied in the image forming apparatus, and a user name 653 and password 654 used in the print service. In this case, the user name 651 is used for logging into the image forming apparatus 120, and the corresponding user name 653 is used for the job information request to the print service. However, the print service account may also be utilized for logging into the image forming apparatus 120.

In S1333, the job information receiving unit 331 of the image forming apparatus 120 issues a job information request to the job information presentation unit 351 of the print service 340. At this time, as the image forming apparatus 120 and the print service 340 have established a session in the account of Admin A, the print service 340 specifies only the pull job of Admin A as the owner under this condition. The account information of the pertinent user in the print service is acquired from the user management table of FIG. 8E, and is added to the arguments of the job information request. Note that the print service user account information of each user is saved in advance under the user name 653 and password 654 of FIG. 8E. A new user can be added using an input unit for registration (not illustrated in the drawings). FIG. 7G5 shows that, in addition to the SPID, the user information of User X is imparted as an argument. The job information receiving unit 331 transmits the job information request shown in FIG. 7G5 to the SP 344a.

In S1334, the SP 344a acquires the job owned by User X from among the pull jobs saved by the job information management unit 349. In FIG. 24C, Job_002 is the relevant one. Next, in S1335, the SP 344a checks whether an AWP linked to the user information has been generated. As an AWP can be generated by user, existence of the AWP 345 of which User X is the owner is confirmed here. The SP 344a is aware of the existence of the SP-AW that is the AWP 345 of User X from the management table shown in FIG. 24A as a result of the confirmation by the printer information management unit 343. Next, in S1336, the SP344a of which Admin A is the owner conducts job information acquisition with respect to the AWP 345 of which User X is the owner. The AWP 345 acquires the job information from the job information management unit 349 in S1337, and transmits the acquired job information to the SP 344a in S1338. Here, Job_001 is in question.

In S1339, the SP344a merges the job information. Here, as shown in FIG. 24D, Job_001 and Job_002 are in question. In S1340, the job information is returned to the image forming apparatus 120. The processing from S1341 to S1346 shown in FIG. 19—i.e., the processing whereby the print job is selected on the panel, and the specified job is downloaded and printed—is identical to the processing from S941 to 5946 described in Embodiment 1.

Next, in S1351, the image forming apparatus 120 transmits the job status. At this time, the image forming apparatus 120 imparts the user information. In S1352, the SP 344a updates the status of its own job. With respect to the remaining job status, in S1353, the SP 344a identifies the AWP of the pertinent user using the user information, and transmits the job status to the AWP 345. At this time, the SP 344a imparts its own printer name to the information. In S1354, the AWP 345 conducts job status updating based on the acquired job status.

In S1355, the AWP 345 imparts the printer name acquired from the SP 344a to its own printer name. That is, previously "output from Anywhere Print" was only known as shown in FIG. 9C1, but "output conducted from MFP-01" comes to be clearly recognized as shown in FIG. 9C2. A notification of update success is carried out in S1356 and S1357.

Next, in S1361 shown in FIG. 20, the web browser 380 issues a print instruction to the SP 344c in the case where the shared MFP-01 is selected, and where an instruction for normal printing (push printing) is issued. As the SP 344c is a shared SP, this print instruction information is sent to the SP 344a that is the sharing source in S1362. In S1363, the SP 344a spools the job. At this time, the SP 344a records the mode of the job information that is managed by the job information management unit 349 as push mode. The SP 344a stores the job as Job-003 as shown in FIG. 24C. "Push" is stored under the mode 639. Job_006 is a job that is spooled by User Y in the same environment.

The processing from S1364 to S1371—i.e., the processing whereby print output is executed after receipt of the notification information A—is identical to the processing from S964 to S971 described in Embodiment 1. Here, as shown in FIG. 24E, Job_003 of User X and Job_006 of User Y are printed. The foregoing has been a description of the print processing flow in the present embodiment.

According to the above processing, even in an environment where a session with an image forming apparatus is established with a manager's account, and multiple users can use it by sharing, it is possible to print only the pull job(s) of a given specific user with a pull print request. That is, an individual user who shares the use of an image forming apparatus can select and print only his/her own job(s), this enhances usability. Moreover, when anywhere printing is executed, the final output target can be displayed in the job status. Furthermore, printed material produced by a certain service printer can be output by another image forming apparatus by conducting information sharing between service printers.

(Embodiment 4)

In Embodiment 3, user information is delivered by a job information request in order to identify the AWP corresponding to the user information in the print service. However, it is a security risk to attach user information in an Internet environment. Thus, in the present embodiment, a method is described wherein the user can be identified even without including user information in the communication. Here, in a given image forming apparatus (SP), it is sufficient to assign a unique ID by user. The registration processing flow of the image forming apparatus is identical to that of Embodiment 3.

Figure 21:
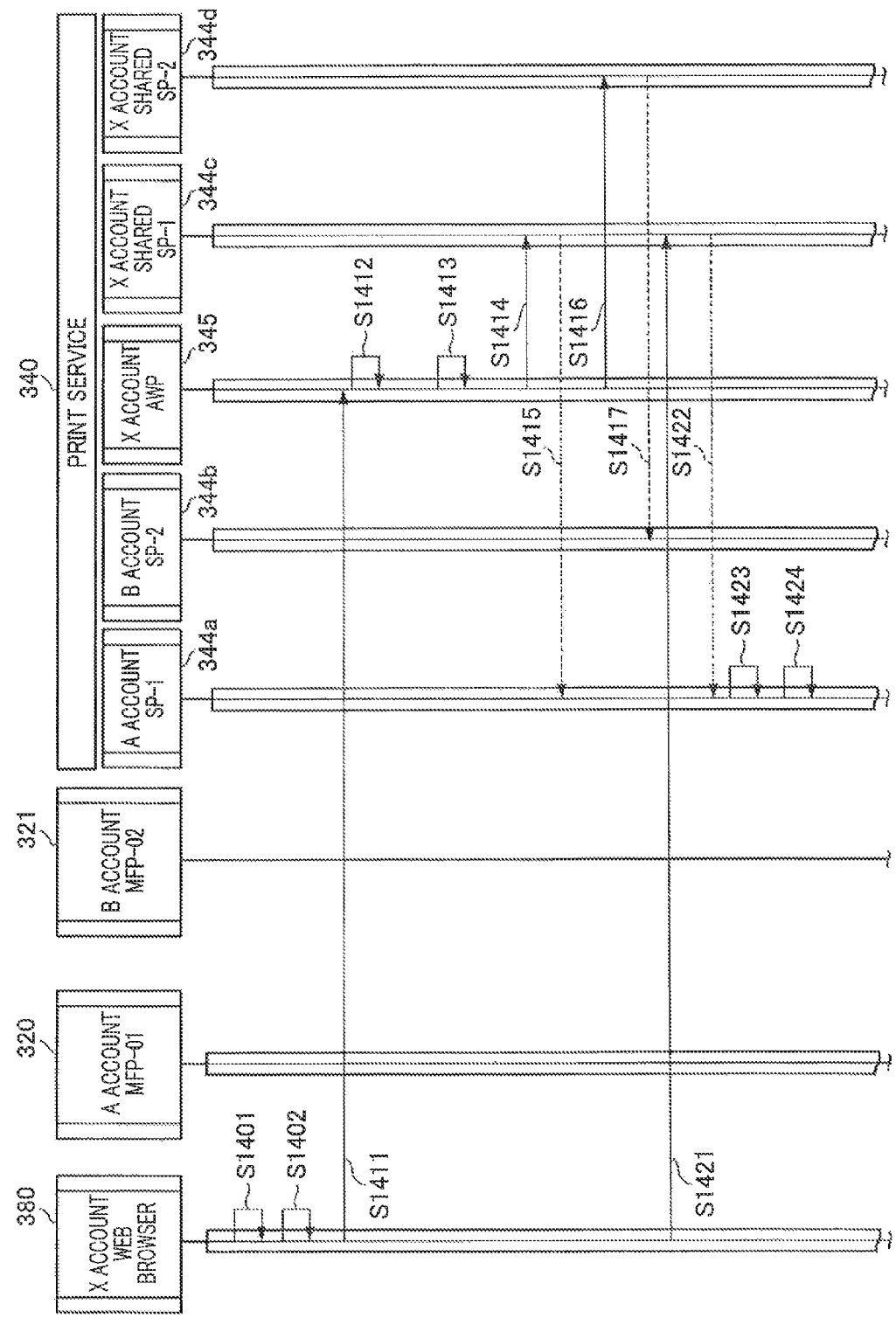
FIG. 21 illustrates processing from print instruction to output of print job in Embodiment 4.
Figure 22:
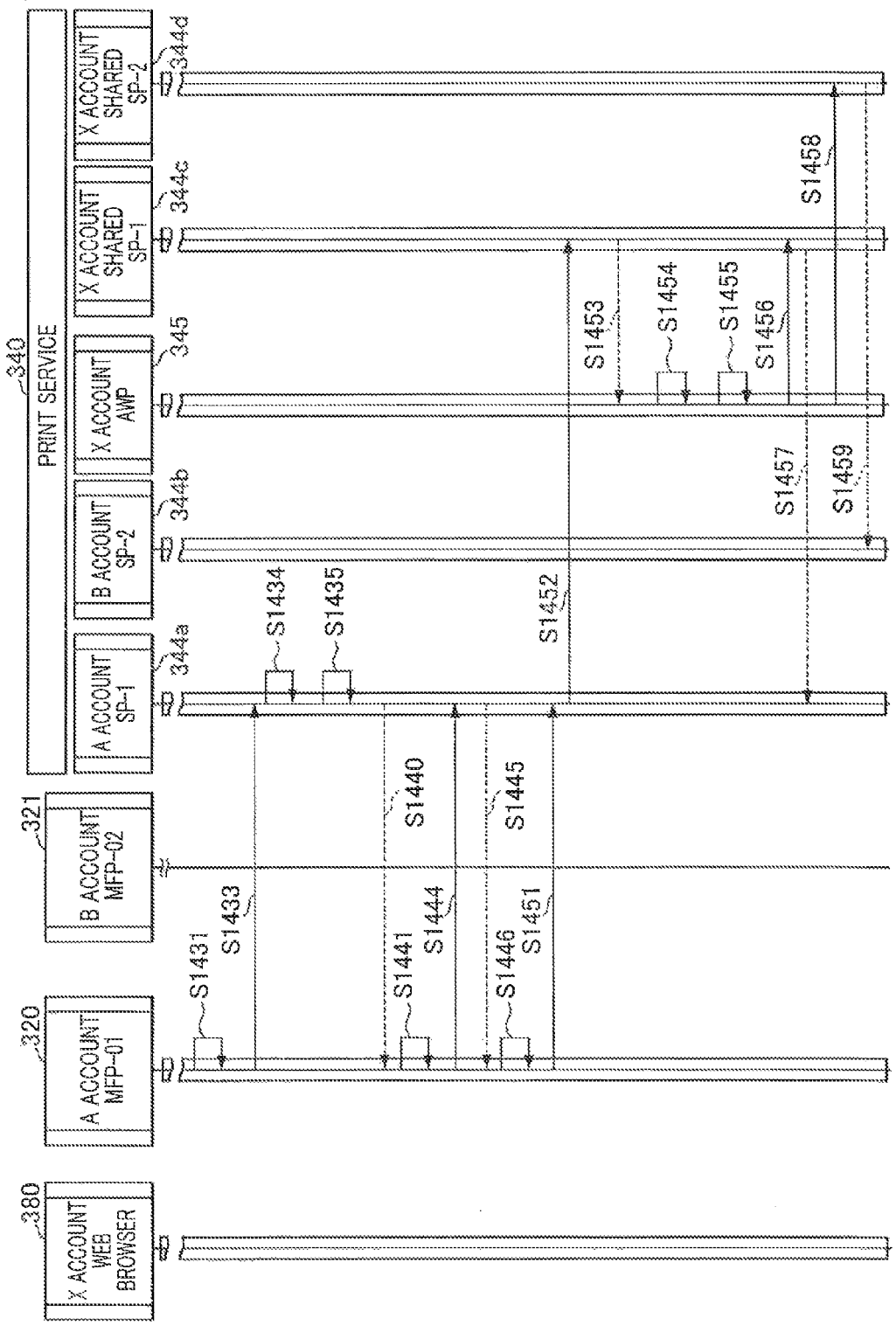
FIG. 22 illustrates processing from print instruction to output of print job in Embodiment 4.

Next, using the flowcharts of FIG. 21 and FIG. 22, a description is given of the print flow in the present embodiment. In the present embodiment, when an instruction for anywhere printing is received, the service printer 340 imparts a user ID, and generates a job in pull mode in the base SP. With respect to a job information request from an image forming apparatus, the information is acquired by conducting exchange only with the SP, and there is no inquiry to the AWP. As a result, there is no need to identify the AWP, and printing can be conducted without attaching the user information.

The processing from S1401 to S1412 is identical to the processing from S901 to S912 described in Embodiment 1. Note that AWP is given as the mode 639 shown in FIG. 25A.

Next, in S1413, the AWP 345 imparts a unique ID, i.e., user identification information that can identify User X as an attribute of the job. With respect to this user identification information, it is sufficient if it distinguishes User X from other users in the printer environment that they use. Here, Job_001 is spooled of FIG. 25. User X is given u001 as a user ID. Job_004 is a job that is spooled by User Y in the same environment. User Y is given u002 as a user ID.

Next, in S1414, the AWP 345 transmits job information to the SP 344*c* that is the AWP target device. As the SP 344*c* is a shared SP, in S1415, the SP 344*c* sends this print instruction information to the SP 344*a* that is the sharing source. Similarly, the AWP 345 transmits job information to the SP 344*d* that is another AWP target device in S1416, and the SP 344*d* transmits the job information to the SP 344*b* that is the sharing source in S1417.

Next, in S1421, the web browser 380 issues an instruction for temporarily stored printing to the SP 344*c* according to the selection of temporarily stored printing by the user. As the SP 344*c* is a shared SP, in S1422, the SP 344*c* sends this print instruction information to the SP 344*a* that is the sharing source. In S1423, the job is spooled in pull mode. Moreover, the user ID of User X is imparted in S1424. This leads to a result Job_002 shown in FIG. 25A. Job_005 is a job that is spooled by the SP 344*a* in the same environment according to the selection of temporarily stored printing by User Y.

Here, it is found that Job_001 and Job_004 are added to both the job management table FIG. 25B for SP-1 and the job management table FIG. 25C for SP-2 generated based on FIG. 25A. Moreover, Job_002 and Job_005 are added to SP-1.

As shown in FIG. 22, when user authentication is conducted and passed in S1431, the image forming apparatus 120 sends the job request to the SP 344*a* in S1433. At this time, the user ID is imparted as an argument. In the job information request listed in FIG. 7G6, in addition to the SPID, it is shown that the user ID of u001 is imparted as an argument. In S1434, SP 344*a* acquires the job linked to the user ID. Here, the job shown in FIG. 25D is acquired. In S1435, SP 344*a* creates the job information. The processing from S1440 to S1446—i.e., the processing whereby print output is executed after receipt of the job information—is identical to the processing from S940 to S946 described in Embodiment 1.

Next, in S1451, the image forming apparatus 120 transmits the job status to the SP 344*a*. In S1452, the job status of the SP 344*a* is also transmitted to and shared with the SP 344*c* that is the shared SP. In S1453, the job status is transmitted to the AWP 345 that uses the SP 344*c* as the target model. At this time, the SP 344*c* also imparts the printer name of the SP 344*c*. In S1454, the AWP 345 updates the status of its own job. In S1455, the printer name that is output is imparted to the job status. The AWP 345 sends the updated job information (with the status that printing has been completed) to the shared target SP 344*c* in S1456, and also shares it with the SP 344*a* in S1457. The AWP 345 conducts the same processing in S1458 and S1459, sharing the job information with the SP 344*b* and the SP 344*d*. The foregoing has been a description of the print processing flow in the present embodiment.

According to the above processing, it is possible to prevent user information from flowing into the traffic that flows on the Internet, and to carry out anywhere printing or temporarily stored printing by having the user identify his/her own job at the time. By carrying out the above, it is possible to safely utilize an anywhere printing function in a cloud print system.

(Embodiment 5)

With Embodiments 1 to 4, an SPID is always imparted at the time of job information acquisition. However, it is also acceptable to acquire all pull jobs of the pertinent user without regard to the image forming apparatus, using only the user ID and the username as arguments.

FIG. 26A is a drawing which shows, for example, a print pattern that is stored by the job information management unit 349 of the print service 340. The print service 340 enables the print pattern to be displayed on the web browser 380. For example, with respect to Job-01, User X issues a print instruction in push mode to SP1 in the User X account. With respect to Job-16, User Y conducts printing in pull mode to the AWP. FIG. 26B is a drawing which shows a print information request pattern stored by the image forming apparatus 120.

When the user designates SP1 only, or SP1 and push mode, the image forming apparatus 120 can acquire Job-01 and Job-02 that are the push jobs to the SP1. When the user designates SP1 and pull, the image forming apparatus 120 can acquire Job-11 and Job-12 that are the pull jobs to the SP1. When the user designates only User X, or User X and pull mode, the image forming apparatus 120 can acquire Job-11, Job-13, Job-15 that are all pull jobs of User X. When the user designates SP1 and User X (or also pull mode), the image forming apparatus 120 can acquire the pull jobs of User X linked to SP1 and AWP, i.e., Job-11 and Job-15. In this case, in the push mode, the image forming apparatus 120 acquire only Job-01 when the user designates SP1, User X, and push.

According to the above processing, when a job request is made from an image forming apparatus, it is possible to designate selection of push jobs and pull jobs, selection of jobs linked to an image forming apparatus and jobs linked to a user, or a combination thereof, thereby enhancing flexibility.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-109872 filed May 11, 2012, which is hereby incorporated by reference herein in its entirety.

The invention claimed is:

1. An information processing apparatus that receives data from a service providing apparatus that provides a web service in response to a print instruction issued by a user who utilizes the web service, and that provides an image forming apparatus via a network with a job for printing that is generated based on the received data, the information processing apparatus comprising:

management means for managing a first printer object that has a correspondence relationship with the image forming apparatus, and a second printer object that does not have a correspondence relationship with the image forming apparatus;

display means for displaying a selection screen in order to select a printer selection item indicating the first printer object, and a printer selection item indicting the second printer object; and transmission means for holding the job without transmitting the job to a specific image forming apparatus when the second printer object is selected and a print instruction is issued, and transmitting, to the image forming apparatus, the job held by the second printer object in response to an access from the image forming apparatus to the first printer object, wherein, the display means further displays a printer selection item for selecting normal printing or temporarily stored printing when the selection item indicating the first printer object is selected, wherein, when the normal printing is selected, the transmission means transmits notification information to the image forming apparatus for providing notification that the job has been generated so as to cause the image forming apparatus that has the correspondence relationship with the first printer object to transmit an acquisition request for the job, and transmits the job to the image forming apparatus upon receipt, from the image forming apparatus, of the acquisition request for the job of a first mode, and wherein, when the temporarily stored printing is selected, the transmission means transmits the job to an image forming apparatus operated by the user upon receipt, from the image forming apparatus operated by the user, of an acquisition request for the job of a second mode without transmitting the notification information.

2. The information processing apparatus according to claim 1, wherein the transmission means transmits either the job held by the first printer object or the job held by the second printer object or both the job held by the first printer object and the job held by the second printer object based on an identification information received from the image forming apparatus that has been accessed to the first printer object.

3. The information processing apparatus according to claim 1, wherein the transmission means transmits the notification information to the image forming apparatus to provide notification that the job has been generated so as to cause the image forming apparatus that has the correspondence relationship to transmit the acquisition request for the job to the first printer object when the printer selection item indicating the first printer object is selected and a print instruction is issued, and transmits the job to the image forming apparatus operated by the user upon receipt, from the image forming apparatus, of the acquisition request for the job received from the image forming apparatus operated by the user without transmitting the notification information when the second printer object is selected and a print instruction is issued.

4. The information processing apparatus according to claim 1, wherein the management means receives a registration request from the image forming apparatus or a user device operated by the user, creates the first or second printer object, and manages registration information of the created printer object, wherein the information processing apparatus further comprises memory means for storing job information of the registered printer object, wherein when the user device requests the registration of the second printer object, the display means displays a selection screen for registering the created first printer object as the second printer object, wherein the management means creates the first printer object selected in the selection screen as the second printer object, and manages the registration information of the second printer object with linkage to the registration information of the first printer object, wherein the second printer object holds the generated job, and causes the memory means to store job information of the pertinent job as a third mode when the printer selection item indicating the second printer object is selected, wherein when the temporarily stored printing is selected, the first printer object holds the generated job, and causes the memory means to store job information of the pertinent job as the second mode with linkage to the job information, when the normal printing is selected, the first printer object causes the memory means to store job information of the job as the first mode with linkage to the job information, and the first printer object acquires the held job from the second printer object if the first printer object has been registered as the second printer object, in the case where the acquisition request for a job of the second mode is received from the image forming apparatus, and where a job of a third mode is included in the job information; and wherein the transmission means transmits jobs of the second mode and the third mode together to the image forming apparatus.

5. The information processing apparatus according to claim 4, wherein the first printer object updates an execution status of the job of the second mode contained in the job information stored by the memory unit, and transmits an execution status of the job of the third mode to the second printer object, upon receipt, from the image forming apparatus, of the execution statuses of the jobs of the second mode and the third mode, and wherein the second printer object updates an execution status of the job of the third mode contained in the job information using the execution status transmitted from the first printer object.

6. The information processing apparatus according to claim 4, wherein, the management means creates a first identification information for identifying the first printer object upon receipt of a request for registration of the image forming apparatus from the image forming apparatus, manages the first identification information with linkage to the registration information of the first printer object, and transmits the first identification information to the image forming apparatus, the management means creates a second identification information for identifying the second printer object when creating the single or multiple first printer objects selected in the selection screen as the second printer object, and causes the image forming apparatus to register the second identification information in addition to the first identification information by transmitting the created second identification information to the image forming apparatus, and wherein the transmission means transmits a job acquired through the first printer object to the image forming apparatus upon receipt of a print instruction from the image forming apparatus using the first identification information, and transmits a job acquired through the second printer object to the image forming apparatus upon receipt of a print instruction from the image forming apparatus using the second identification information.

7. The information processing apparatus according to claim 4, wherein the management means receives a shared registration that individual users share the image forming apparatus by, creates a third printer object for each user that has a correspondence relationship with the image forming apparatus, adds user information as a sharing destination to the registration information of the first printer object, and creates registration information for an individual user based on the registration information, wherein when the display means displays a selection screen that registers a fourth printer object that is a second printer object for the individual user when the user device operated by the individual user requests a registration of the second printer object, the management unit further creates a fourth printer object based on the single or multiple third printer objects selected by the selection screen, and links the registration information of the fourth printer object to the registration information for the individual user and the registration information of the first printer object, wherein the fourth printer object holds a job, and stores job information of the job in the memory means as the third mode, when a printer selection item indicating the second printer object is selected by a user device of the individual user, wherein the third printer object transmits a generated job to the first printer object that is a sharing source, and the first printer object stores job information of the job in the memory unit as the second mode, when the temporarily stored printing is selected by a user device operated by the individual user;

the first printer object receives a print instruction and the user information from the image forming apparatus operated by the individual user, acquires the job of the second mode that is linked to the user information from the memory unit, and acquires the job of the third mode from the fourth printer object when the job of the third mode linked to the user information is included in the job information;

the transmission means transmits the jobs of the second mode and the third mode related to the individual user together to the image forming apparatus.

8. The information processing apparatus according to claim 7, wherein the first printer object updates an execution status of a job of the second mode linked to the user information stored by the memory unit, and transmits an execution status of a job of the third mode and a printer name of the first printer object to the fourth printer object, upon receipt, from the image forming apparatus, of the execution statuses of the jobs of the second mode and the third mode related to the individual user, and wherein the fourth printer object updates an execution status of the job of the third mode contained in job information stored by the memory unit to the execution status transmitted from the first printer object, and adds the printer name of the first printer object to a printer name of the fourth printer object.

9. The information processing apparatus according to claim 7, wherein the fourth printer object creates user identification information for identifying the individual user when the printer selection item indicating the second printer object is selected by the individual user, and transmits the generated job and the user identification information to the third printer object, and wherein the third printer object transmits the job and the user identification information transmitted from the fourth printer object to the first printer object so as to cause the first printer object to share the job information linked to the user information;

the third printer object transmits the generated job to the first printer object when the third printer object is selected;

the first printer object holds the job transmitted from the third printer object, adds user identification information for identifying the individual user to job information of the job, and stores it with linkage to job information stored by the memory unit;

the first printer object receives a print instruction and the user identification information from the image forming apparatus operated by the individual user, and transmits the held job linked to the user identification information transmitted from the third and the fourth printer objects to the image forming apparatus.

10. The information processing apparatus according to claim 7, wherein when the individual user selects the normal printing, in order to cause the image forming apparatus that has a correspondence relationship with the first printer object to transmit an acquisition request for the job, the transmission means transmits notification information to the image forming apparatus to provide notification that the job has been generated, acquires the job of the first mode of which the individual user is a target from the memory unit, and transmits the job to the image forming apparatus in response to acquisition from the image forming apparatus of a print instruction containing the user information and the acquisition request for the job of the first mode;

when the individual user selects the temporarily stored printing, the transmission means acquires the job of the second mode linked to the user information and of which only the individual user is a target from the memory unit, and transmits the job to the image forming apparatus in response to acquisition from the image forming apparatus of a print instruction containing the user information or a print instruction containing the user information and the acquisition request for the job of the second mode; and when the individual user selects a selection item that shows the second printer object, the transmission means acquires the jobs of the second mode and the third mode linked to the user information and of which only the individual user is a target from the memory unit, and transmits the jobs to the image forming apparatus, in response to acquisition from the image forming apparatus of a print instruction containing identification information of the first printer object and the user information, or a print instruction containing identification information of the first printer object and the user information and the acquisition request for the job of the second mode.

11. A print system, comprising an information processing apparatus that receives data from a service providing apparatus that provides a web service in response to a print instruction issued by a user who utilizes the web service, and that generates a job based on the received data;

and an image forming apparatus that receives a job generated by the information processing apparatus via a network and executes printing;

wherein, the information processing apparatus comprises:

management means for managing a first printer object that has a correspondence relationship with the image forming apparatus, and a second printer object that does not have a correspondence relationship with the image forming apparatus;

a display means for displaying a selection screen for selecting a printer selection item indicating the first printer object, and a printer selection item indicating the second printer object; and transmission means for holding the job without transmitting the job to a specific image forming apparatus when the second printer object is selected and a print instruction is issued, and transmitting, to the image forming apparatus, the job held by the second printer object in response to an access from the image forming apparatus to the first printer object, wherein the display means further displays a printer selection item for selecting normal printing or temporarily stored printing when the selection item indicating the first printer object is selected, wherein when the normal printing is selected, the transmission means transmits notification information to the image forming apparatus to provide notification that the job has been generated so as to cause the image forming apparatus that has the correspondence relationship with the first printer object to transmit an acquisition request for the job, and transmits the job to the image forming apparatus upon receipt, from the image forming apparatus, of the acquisition request for the job of a first mode, and wherein when the temporarily stored printing is selected, the transmission means transmits the job to an image forming apparatus operated by the user upon receipt, from the image forming apparatus operated by the user, of the acquisition request for the job of a second mode without transmitting the notification information, and wherein the image forming apparatus comprises:

request means for issuing the acquisition request for the job to the information processing apparatus upon receipt of the notification information from the information processing apparatus, or in response to an operation by the user; and execution means for receiving the job from the information processing apparatus, and executing the job.

12. A method for controlling an information processing apparatus which receives data from a service providing apparatus that provides a web service in response to a print instruction issued by a user who utilizes the web service, and which provides a job for printing that is generated based on the received data to an image forming apparatus via a network, the method comprising the steps of:

managing by a management unit a first printer object that has a correspondence relationship with the image forming apparatus, and a second printer object that does not have a correspondence relationship with the image forming apparatus;

displaying by a display unit a selection screen in order to select a printer selection item indicating the first printer object, and a printer selection item indicating the second printer object;

holding the job without transmitting the job to a specific image forming apparatus when the second printer object is selected and a print instruction is issued, and transmitting, to the image forming apparatus, the job held by the second printer object in response to an access from the image forming apparatus to the first printer object, wherein, in the displaying, a printer selection item for selecting normal printing or temporarily stored printing is displayed when the selection item indicating the first printer object is selected, wherein, when the normal printing is selected, notification information is transmitted to the image forming apparatus for providing notification that the job has been generated so as to cause the image forming apparatus that has the correspondence relationship with the first printer object to transmit an acquisition request for the job, and the job is transmitted to the image forming apparatus upon receipt, from the image forming apparatus, of the acquisition request for the job of a first mode, and wherein, when the temporarily stored printing is selected, the job is transmitted to an image forming apparatus operated by the user upon receipt, from the image forming apparatus operated by the user, of an acquisition request for the job of a second mode without transmitting the notification information.

13. A non-transitory storage medium on which is stored a computer program for making a computer execute the method for controlling an information processing system as defined in claim 12.

* * * * *